(12) United States Patent
Nishiguchi

(10) Patent No.: US 6,368,760 B1
(45) Date of Patent: Apr. 9, 2002

(54) PHASE SHEET

(75) Inventor: Kenji Nishiguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/975,226

(22) Filed: Nov. 21, 1997

(30) Foreign Application Priority Data

Nov. 22, 1996 (JP) .............................................. 8-312482

(51) Int. Cl.$^7$ ............................................. G02F 1/1335
(52) U.S. Cl. ........................ 430/20; 430/321; 252/585; 359/465; 359/489
(58) Field of Search ................................. 430/290, 321, 430/20; 349/15; 359/465, 489; 252/585

(56) References Cited

U.S. PATENT DOCUMENTS

| 5,537,144 A | 7/1996 | Faris |
| 5,539,074 A | 7/1996 | Herr et al. |
| 5,602,661 A | 2/1997 | Schadt et al. |
| 5,706,131 A | * 1/1998 | Ichimura ..................... 359/490 |

FOREIGN PATENT DOCUMENTS

| JP | 3-65943 | 3/1991 |
| JP | 5-346563 | 12/1993 |
| JP | 6-289374 | 10/1994 |
| JP | 7-5325 | 1/1995 |
| JP | 7-36008 | 2/1995 |
| JP | 7-261024 | 10/1995 |

OTHER PUBLICATIONS

Schadt, et al., "Surface–Induced Parallel Alignment of Liquid Crystals by Linearly Polymerized Photopolymers", Jpn. J. Appl. Phys., vol. 31, Part 1, No. 7, Jul. 1992, pp. 2155–2164.

* cited by examiner

Primary Examiner—John A. McPherson
(74) Attorney, Agent, or Firm—Nixon & Vanderhye P.C.

(57) ABSTRACT

The phase sheet includes a first region and a second region which have respectively different slow axis directions or fast axis directions. A polymer constituting the sheet contains a photoisomeric molecule.

4 Claims, 12 Drawing Sheets

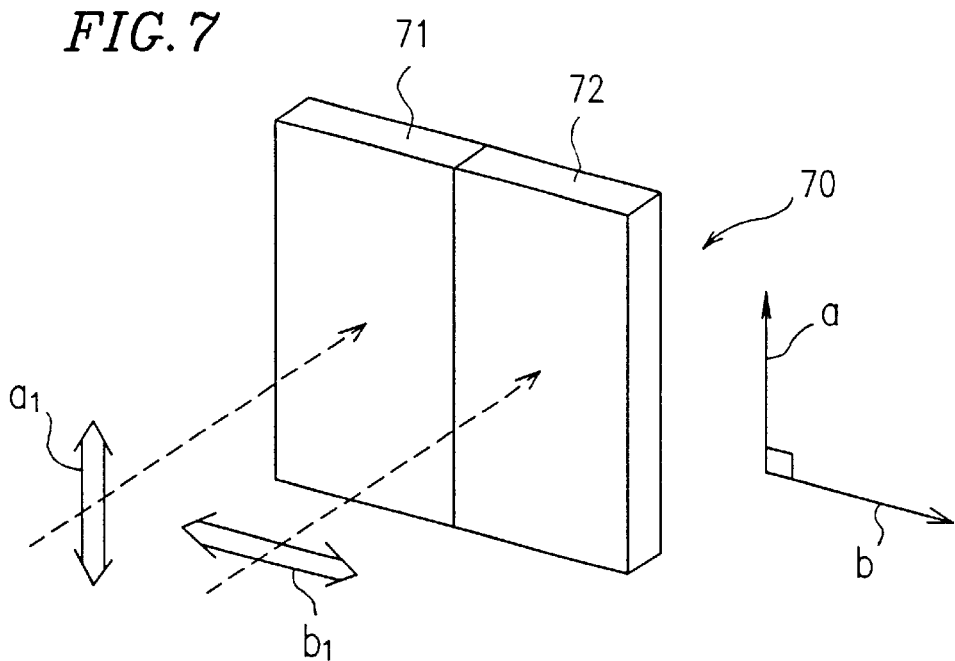

PHASE SHEET

BACKGROUND OF THE INVENTION

1. Field of the Invention

The present invention relates to a phase sheet, a method for fabricating the same and a stereoscopic display device using the same. More particularly, the present invention relates to a phase sheet for stereoscopic display allowing for a liquid crystal display device to display a stereoscopic image, a method for fabricating the same and a stereoscopic display device using the same.

2. Description of the Related Art

A conventional stereoscopic display device alternately displays an image component to be viewed by the right eye (hereinafter, simply referred to as a "right-eye image component") and an image component to be viewed by the left eye (hereinafter, simply referred to as a "left-eye image component") at a high speed. These displayed image components are viewed by the human eyes as a stereoscopic image through a pair of spectacles in which the right-eye lens and the left-eye lens are alternately shut at a high speed. The operations of the pair of spectacles and the image display device are controlled to be synchronous with each other such that, when the right-eye lens of the spectacles is shut, the left-eye image component is perceived and that, when the left-eye lens of the spectacles is shut, the right-eye image is perceived. However, such a pair of spectacles used for stereoscopic display requires a complicated structure for alternately shutting the right-eye and the left-eye lenses at a high speed. In addition, a complicated controller for synchronizing the image components imaged via the spectacles with the image displayed on the display device is also required.

In another exemplary stereoscopic display device, a first and a second polarizer, each having a predetermined display unit, are adjacently disposed, such that the polarization directions thereof cross each other at a right angle, and polarizing films are alternately arranged on the plane of each polarizer to form a uniform arrangement pattern having a symmetry.

For example, Japanese Laid-Open Publication No. 7-5325 discloses a stereoscopic display device allowing for stereoscopic display by providing polarizing films corresponding to respective arrangement patterns for each of a pair of substrates disposed in a liquid crystal panel so as to face each other and by using a pair of spectacles including polarizing films having transmission axes which cross each other at a right angle and respectively correspond to the right eye and the left eye.

In general, an alignment film of a liquid crystal display used for a stereoscopic display device aligns the orientations of a liquid crystal material with a uniaxial direction by conducting a rubbing treatment. However, in the case of providing polarizing films, patterned so as to have the transmission axis directions defined in the above-described manner, for such a liquid crystal display, the stereoscopic display device is required to take either one of the following arrangements (1) and (2).

(1) An arrangement in which a Normally White (NW) mode and a Normally Black (NB) mode are associated with the left eye and the right eye, respectively.

Specifically, as shown in FIG. 10, in such a stereoscopic display device 10, a pair of substrates 100a and 100b, having alignment films (not shown) which have been subjected to a rubbing treatment in a direction 45 degrees away from an arbitrary direction X and in a direction 135 degrees away from the direction X, respectively, are disposed such that the rubbing directions cross each other at a right angle. A polarizing film 101a is provided over the substrate 100a. In a region corresponding to a left-eye pixel (i.e., a region associated with the NW mode), a transmission axis 102a of the polarizing film 101a is oriented so as to be aligned with a rubbing axis 104a on the substrate 100a (i.e., in the direction 45 degrees away from the direction X). On the other hand, in a region corresponding to a right-eye pixel (i.e., a region associated with the NB mode), a transmission axis 102b of the polarizing film 101a is oriented so as to be orthogonal to the rubbing axis 104a on the substrate 100a (i.e., in the direction 135 degrees away from the direction X). Furthermore, another polarizing film 101b is provided so as to face the surface of the substrate 100b opposite to the surface thereof facing the substrate 100a. In both regions corresponding to a left-eye pixel and a right-eye pixel, transmission axes 103a and 103b of the polarizing film 101b are oriented so as to be aligned with a rubbing axis 104b of the substrate 100b (i.e., in the direction 135 degrees away from the direction X).

(2) An arrangement in which the rubbing axes of the alignment films disposed over the substrates are not aligned with the transmission axes of the polarizing films.

Specifically, as shown in FIG. 11, in such a stereoscopic display device 10, a pair of substrates 100a and 100b having alignment films (not shown) which have been subjected to a rubbing treatment in a direction 45 degrees away from an arbitrary direction X and in a direction 135 degrees away from the direction X, respectively, are disposed such that these rubbing directions cross each other at a right angle. A polarizing film 111a is provided over the substrate 100a. In a region corresponding to a left-eye pixel, a transmission axis 112a of the polarizing film 111a is oriented so as to be parallel to the direction X (i.e., in the direction 0 degree away from the direction X). On the other hand, in a region corresponding to a right-eye pixel, a transmission axis 112b of the polarizing film 111a is oriented so as to be orthogonal to the direction X (i.e., in the direction 90 degrees away from the direction X). Furthermore, another polarizing film 111b is provided so as to face the surface of the substrate 100b opposite to the surface thereof facing the substrate 100a. In a region corresponding to a left-eye pixel, a transmission axis 113a of the polarizing film 111b is oriented so as to be orthogonal to the direction X (i.e., in the direction 90 degrees away from the direction X). On the other hand, in a region corresponding to a right-eye pixel, a transmission axis 113b of the polarizing film 111b is oriented so as to be parallel to the direction X (i.e., in the direction 0 degree away from the direction X).

However, a stereoscopic display device having the arrangement (1) or (2) has the following problems. In a stereoscopic display device having the arrangement (1), a color tone shift is caused between a resulting right-eye image component and a resulting left-eye image component. On the other hand, in a stereoscopic display device having the arrangement (2), since the vibration direction of polarized light transmitted through a liquid crystal layer existing between the substrates 100a and 100b is not aligned with any of the directions of the transmission axes of the polarizing films, a considerable amount of light is lost when the light is transmitted through the polarizing films. Consequently, an image having a satisfactory contrast ratio cannot be obtained.

Furthermore, a method for displaying a stereoscopic image by using a lenticular plate 120 as shown in FIG. 12 is also known. In a stereoscopic display device utilizing such a method, image components viewed from different directions, e.g., a right-eye image component 122R and a left-eye image component 122L, are continuously represented in a stripe shape on a reverse surface (i.e., a focal plane) of the lenticular plate 120. In front of the lenticular plate 120, the right-eye image component 122R and the left-eye image component 122L can be imaged by the right and the left eyes, respectively, via a certain gap therebetween. By viewing the separate right and left image components by the right and the left eyes in this manner, a three-dimensional image (i.e., a stereoscopic image) can be perceived.

By utilizing this principle, Japanese Laid-Open Publication No. 3-65943, for example, discloses a liquid crystal stereoscopic display device in which a three-dimensional dimensional image can be formed by disposing the lenticular plate 120 on a front panel 131 of a liquid crystal display 130 and by alternately inputting the right-eye image component 122R and the left-eye image component 122L to the liquid crystal display 130 every other vertical line of the display 130, as shown in FIG. 13.

In such a stereoscopic display device utilizing the lenticular plate 120, light-blocking portions called a black matrix 133 exist between adjacent pixel openings 132 of the liquid crystal display 130, as shown in FIG. 14. Assuming that a pixel pitch of the liquid crystal display 130 in the horizontal direction and a distance between two adjacent pixels are denoted by L and M, respectively, and that the distance between the eyes of a human viewer is 65 mm, a movement range R of the human eyes within which a stereoscopic image can be perceived is limited to the range defined by the following equation in which an image 132$i$ of the pixel opening 132 is formed with respect to each of the right and the left eyes.

$$R=65 \times M/L$$

However, in such a stereoscopic display device, if the head or the eyes of the viewer move to exceed the range in which the above equation is satisfied, an image 133$i$ of the black matrix 133 is imaged by the eyes, so that a three-dimensional image cannot be perceived.

Japanese Laid-Open Publication No. 5-346563 discloses a material for an optical modulator using side-chain type polymer liquid crystal molecules containing a photochromic compound as a substituent in a side chain. For example, the photochromic compound may be expressed by the following Formula 1:

[Formula 1]

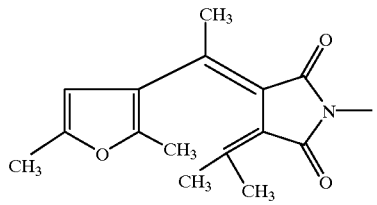

Japanese Laid-Open Publication No. 7-36008 discloses an optical modulator using the side-chain type polymer liquid crystal molecules. In the material for an optical modulator and the optical modulator described in these publications, since the structure of the photochromic compound changes upon the irradiation of light, the orientations of the side-chain type polymer liquid crystal molecules themselves are changed. Because of the change in orientations of the liquid crystal molecules, the light transmitted through the liquid crystal layer is changed, i.e., the absorption spectrum thereof is changed. In other words, information about the light irradiated onto the optical modulator is converted into information about the change in absorption spectrum.

Japanese Laid-Open Publication No. 6-289374 discloses the technologies for locally changing the orientation directions of a liquid crystal layer by using an alignment layer having a photo-orientable polymer network (PPN) and by changing the orientation directions of the polymers upon the irradiation of polarized light.

However, in the case of using such an alignment film having a PPN, a liquid crystal cell is required to be formed on a pair of transparent substrates such as glass substrates so as to attain a sufficient retardation for the alignment film as a phase sheet for stereoscopic display. Thus, a problem is caused in that the production yield is considerably decreased in such a case.

SUMMARY OF THE INVENTION

The phase sheet of this invention includes a first region and a second region which have respectively different slow axis directions or fast axis directions. A polymer constituting the sheet contains a photoisomeric molecule.

In one embodiment of the invention, the slow axis directions or the fast axis directions of the first and the second regions are different from each other by about 90 degrees.

In another embodiment of the invention, the polymer is a polymer liquid crystal molecule.

In still another embodiment of the invention, the polymer liquid crystal molecule is a main-chain type polymer liquid crystal molecule.

In still another embodiment of the invention, the polymer liquid crystal molecule is a side-chain type polymer liquid crystal molecule.

In still another embodiment of the invention, an photoisomeric functional group of the photoisomeric molecule is bonded to the polymer.

In still another embodiment of the invention, the polymer contains a polymerizable resin.

In still another embodiment of the invention, a polymerizable functional group of the polymerizable resin is bonded to the polymer.

In still another embodiment of the invention, the polymerizable resin is a compound having a polymerizable liquid crystal structure.

In still another embodiment of the invention, the polymerizable functional group is a photopolymerizable functional group.

In still another embodiment of the invention, the polymerizable functional group is a thermopolymerizable functional group.

In still another embodiment of the invention, the polymer chain has uniaxial properties.

The method of this invention, for fabricating a phase sheet including a first region and a second region which have respectively different slow axis directions or fast axis directions, includes the steps of: forming a pretreatment sheet containing a photoisomeric molecule; and forming the first region and the second region which have respectively different slow axis directions or fast axis directions by irradiating light having an irradiation intensity distribution onto the pretreatment sheet.

In one embodiment of the invention, the method further includes a step of uniaxially orienting the pretreatment sheet.

The stereoscopic display device of this invention, includes a liquid crystal material interposed between a pair of substrates facing each other and a phase sheet, having a first region and a second region which have respectively different slow axis directions or fast axis directions, on at least one of the substrates. The first region and the second region are adjacent to each other, and arranged in a uniform pattern having a symmetry.

In one embodiment of the invention, the phase sheet is provided on a surface of at least one of the pair of substrates, the surface being opposite to a surface thereof facing the liquid crystal material.

The stereoscopic display device of this invention separates a right-eye image component and a left-eye image component from each other by two types of phase difference regions having respectively different slow axis directions or fast axis directions. A liquid crystal material is interposed between a pair of substrates facing each other, and at least one of the substrates includes the two types of phase difference regions having respectively different slow axis directions or fast axis directions.

Hereinafter, the functions or the effects to be attained by the present invention will be described.

In the phase sheet of the present invention, the polymer constituting of the sheet contains an photoisomeric molecule. Thus, in the case of irradiating light onto such a phase sheet with a predetermined pattern, the slow axis directions or the fast axis directions may be different from each other between the phase difference regions, i.e., regions which have been irradiated with light and regions which have not been irradiated with light.

Furthermore, by arranging the phase difference regions (i.e., the first regions and the second regions) formed upon the irradiation of light having such an irradiation intensity distribution so as to respectively correspond to the right-eye pixels and the left-eye pixels, the polarization direction of the light outgoing from the right-eye pixels may be different from that of the light outgoing from the left-eye pixels.

Moreover, the polymer chain constituting of the phase sheet of the present invention preferably has uniaxial properties, and thus may align the orientations of the photoisomeric molecule with a uniaxial direction. As a result, the photoisomeric molecules in the phase sheet may be oriented with a high density.

In the stereoscopic display device of the present invention, the slow axis direction or the fast axis direction of the regions disposed for the right-eye pixels is different from the counterpart of the regions for the left-eye pixels. Thus, by appropriately setting the directions of the polarization axes of the spectacles worn by a viewer for the right eye and the left eye, respectively, the image component from the right-eye pixels may be viewed only by the right eye and the image component from the left-eye pixels may be viewed only by the left eye.

In the stereoscopic display device of the present invention, at least one of the substrates used includes two types of phase difference regions having respectively different slow axis directions or fast axis directions. As a result, before light is transmitted through an isotropic layer such as a glass substrate, the vibration direction of polarized light outgoing from the right-eye pixels may be different from that of polarized light outgoing from the left-eye pixels.

Thus, the invention described herein makes possible the advantage of providing a phase sheet allowing for the perception of a three-dimensional image (i.e., a stereoscopic image) irrespective of a viewing position, a method for fabricating the same, and a stereoscopic display device using the same.

This and other advantages of the present invention will become apparent to those skilled in the art upon reading and understanding the following detailed description with reference to the accompanying figures.

DESCRIPTION OF THE DRAWINGS

FIG. 6A is a schematic representation illustrating a process step of forming the first regions in the pretreatment sheet; FIG. 6B is a schematic representation illustrating a process step of forming the second regions in the pretreatment sheet; and FIG. 6C is a schematic representation showing an exemplary arrangement of the first regions and the second regions formed in the phase sheet of the present invention by the precess steps shown in FIGS. 6A and 6B, respectively.

FIG. 7 is a schematic representation showing the relationship between the polarization axis direction of the light irradiated onto the phase sheet of the present invention and the refraction axis directions in the respective regions.

DESCRIPTION OF THE PREFERRED EMBODIMENTS

Figure 1:
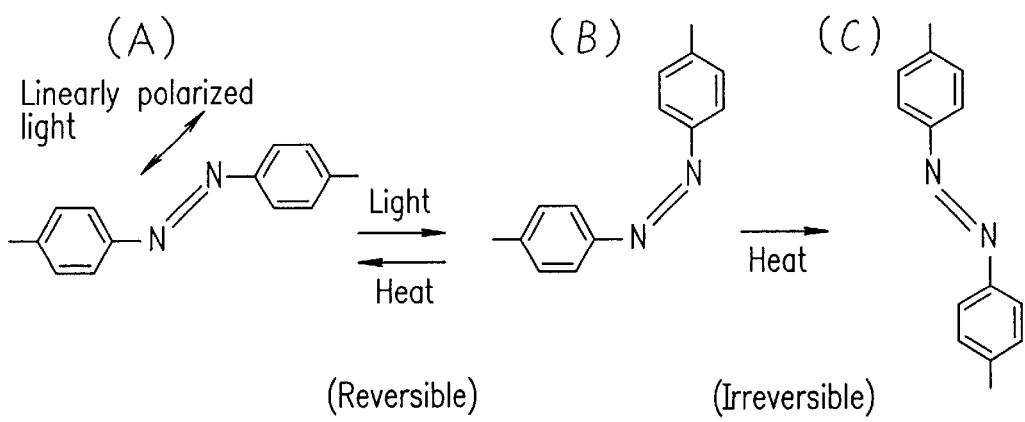
FIG. 1 is correlations diagram illustrating the process during which the orientation of an exemplary photoisomeric molecule of the present invention changes in response to linearly polarized light.

The phase sheet of the present invention includes first regions and second regions which have respectively different slow axis directions or fast axis directions. In this specification, a state where "slow axis directions or fast axis directions are different from each other" refers to a state where a slow axis direction or a fast axis direction in the first region of the phase sheet is anti-parallel to a slow axis direction or a fast axis direction in the second region of the phase sheet. The slow axis direction or the fast axis direction of the first region is different from the slow axis direction or the fast axis direction of the second region preferably by 90 degrees.

The first regions and the second regions in the phase sheet of the present invention may be arranged so as to be adjacent to each other in a stripe shape as will be described later or arranged in a lattice shape so as to correspond to the respective pixels of a liquid crystal display device. However, the arrangement patterns of the first and the second regions are not particularly limited to these patterns.

In the phase sheet of the present invention, the polymers constituting the phase sheet contain at least one kind of photoisomeric molecule. The photoisomeric molecule used in the present invention is required for controlling the slow axis directions or the fast axis directions of the phase sheet to be obtained. If the photoisomeric molecule is irradiated with light or heated, a stereoisomerization or a structural isomerization is generated. The photoisomeric molecule used in the present invention is preferably a compound which generates an reversible isomerization upon the irradiation of light having a predetermined wavelength (e.g., about 365 nm) or heating.

The photoisomeric molecule is a known photochromic compound including a photoisomeric functional group. Specific examples of the photoisomeric molecule include azobenzene compounds, benzaldoxime compounds, azomethine compounds, stilbene compounds, spiropyran compounds, spirooxadine compounds, fulgide compounds, diarylethene compounds, cinnamate compounds, retinal compounds and hemithioindigo compounds. In particular, azobenzene compounds, spiropyran compounds and cinnamate compounds are preferable. Among them, cinnamate compounds are most preferable.

Morever, the photoisomeric molecule may be either a monomer or a polymer. In the case where the photoisomeric molecule is a polymer, the photoisomeric functional group of the photoisomeric molecule may have similar functions (i.e., a similar photoisomeric function) no matter whether the functional group is contained in the main chain or on the side chain of the polymer. The photoisomeric functional group of the photoisomeric molecule is preferably bonded to the polymer constituting of the phase sheet to be described later. Consequently, the photoisomeric molecules (or photoisomeric functional groups) may be uniformly distributed in the phase sheet. Furthermore, in the case of disposing the phase sheet on a surface in contact with a liquid crystal layer between a pair of substrates as will be described later, a high reliability is realized because it is possible to prevent the photoisomeric molecules from being eluted from the phase sheet. The polymer used as the photoisomeric molecule may be either a homopolymer or a copolymer. In the case where the photoisomeric molecule is a copolymer, the copolymerization ratio thereof may be set by those skilled in the art at an arbitrary value in order to appropriately adjust the physical properties thereof such as photoisomeric function, a glass transition point Tg and the like.

The polymer constituting the phase sheet to be described later includes a group functioning as a spacer (a spacer group) for bonding the polymer to the photoisomeric molecule (i.e., the photoisomeric functional group). The spacer group is bonded to a site of the photoisomeric molecule (i.e., the photoisomeric functional group) in the long axis direction thereof, whereby a bond between the polymer and the photoisomeric functional group of the photoisomeric molecule is formed via the spacer group.

Preferably, such a spacer group is a bivalent group derived from a monovalent group such as an alkyl group, an alkenyl group, an alkynyl group, an aryl group, a heterocyclic group, a carboxyl group, a carbamoyl group, an acyl group, an amino group, an ureido group, an alkoxy group, a sulfo group, a sulfamoyl group, an alkoxycarbonyl group, an aryloxycarbonyl group, an aminoalkyl group, an aminoaryl group, an acylamino group, an alkylsulfonylamino group, an aminosulfonylaryl group, an aryloxy group, an acyloxy group, an alkylsulfonyloxy group, an arylsulfonyloxy group, an alkylthio group, an acylthio group, an alkylsulfonyl group, an arylsulfonyl group or the like. However, when the length of the spacer group is too long, following drawbacks are realized: (1) even if the photoisomerization reaction at photoisomeric functional group occurs, change in orientation of the polymer is little, (2) moreover, the orientation of the molecule including the spacer group is not likely to be stabilized. Additionally, when the size of spacer group is bulky, it takes relatively much time to complete the photoisomerization reaction. Considering the above, preferable examples of the spacer group include:

[Formula 2]

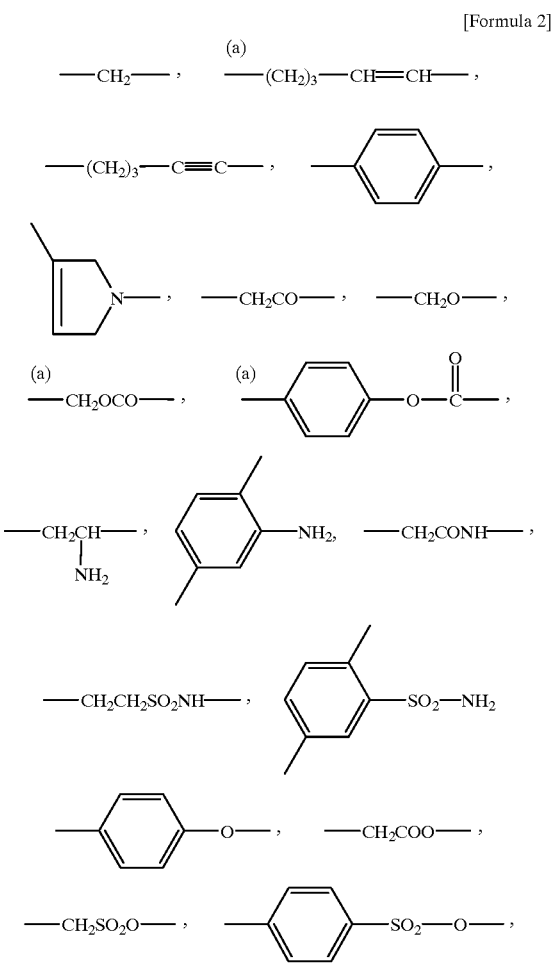

—CH₂CH₂S—,    —CH₂COS—,    —CH₂SO₂—,

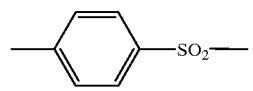

and these groups containing a cyano group or halogen atoms such as F, Cl, Br and the like. In Formula 2, the spacer groups with the suffix (a) are especially preferable. It is noted that the orientation of the spacer group bonding the polymer to the photoisomeric molecule (i.e., the photoisomeric functional group) is not particularly limited.

The content of the photoisomeric molecule used in the present invention is determined based on the total weight of the phase sheet: preferably, in the range from about 0.01 wt % to about 50 wt %, more preferably in the range from about 1 wt % to about 20 wt %. If the content of the photoisomeric molecule is smaller than 0.01 wt %, a sufficient retardation may not be obtained in the resulting phase sheet. On the other hand, if the content of the photoisomeric molecule exceeds 50 wt %, the resulting phase sheet may not be formed in a sheet shape.

The polymer constituting the phase sheet of the present invention preferably has a uniaxial polymer chain. Also, the polymer used in the present invention is preferably a polymer liquid crystal molecule. In this specification, the "polymer liquid crystal molecule" generally refers to a polymer exhibiting liquid crystal properties in the molten state. If the polymer chain in the vicinity of the photoisomeric molecule follows or exhibits the same orientation behavior as that of the photoisomeric molecule, then polymers not exhibiting particular liquid crystal properties are also included. Preferably, the polymer liquid crystal molecule may be either a main-chain type polymer liquid crystal molecule or a side-chain type polymer liquid crystal molecule.

The main-chain type polymer liquid crystal molecule is a polymer obtained by condensing and polymerizing a hydroxy carbonate, an aromatic dicarbonate, an aromatic diol or the like in accordance with a method known to those skilled in the art. For example, a random copolymer and a block copolymer respectively having the structures represented by the following Formula 3 are usable.

(2) Block copolymer

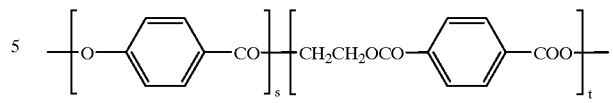

(where s and t are integers, s is preferably from 10 to 300, and t is preferably from 30 to 1000).

These main-chain type polymer liquid crystal molecules have an excellent heat resistance and such properties as to show little variation in orientation once the polymer liquid crystal molecules have been aligned with an arbitrary direction.

The side-chain type polymer liquid crystal molecule is a polymer in which a functional group exhibiting liquid crystal properties is bonded to the polymer main chain. For example, the polymer main chain may be a methylene group and the group expressed by the following Formula 4:

[Formula 4]

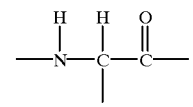

The functional group exhibiting liquid crystal properties has a structure expressed by the following Formula 5:

[Formula 5]

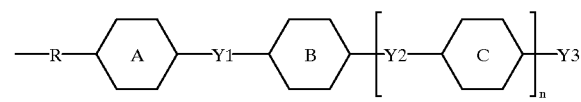

where n is 0 or 1, the six-membered rings A, B and C are independently selected from the group consisting of the structures expressed by the following Formula 6:

[Formula 3]

(1) Random copolymer

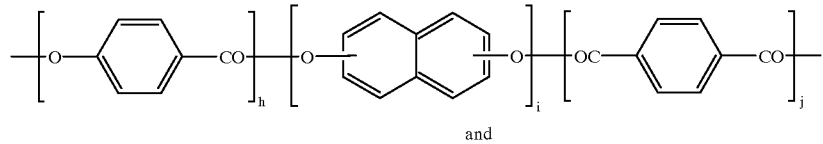

and

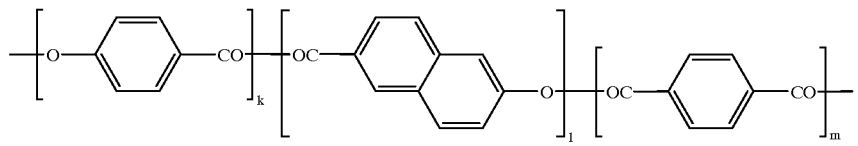

(where (h, i, j) and (k, l, m) are integers, and examples of preferable ratios of (h, i, j) and (k, l, m) include 1:1:1, 2:3:2 and 5:4:4).

[Formula 6]

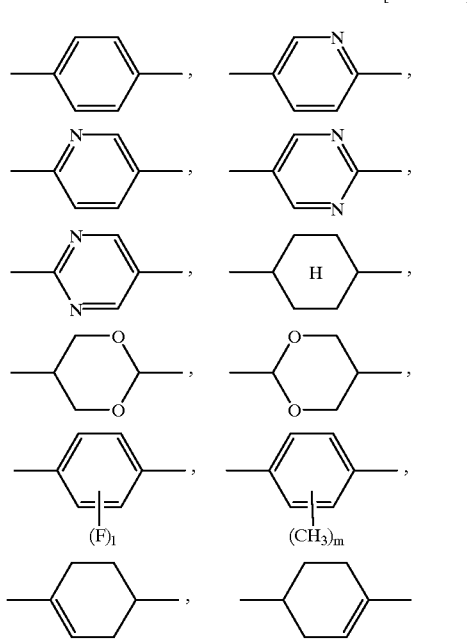

where 1 and m are integers from 1 to 4, Y1 and Y2 are independently selected from the group consisting of a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH$_2$=CHCH$_2$CH$_2$— and —CH$_2$CH$_2$CH=CH—, Y3 is a hydrogen atom; a halogen atom; a cyano group; or an alkyl group, an alkoxy group, an alkenyl group or an alkenyloxy group having 1 to 20 carbon atoms, and R is a functional group having a bivalently bonding group expressed by a single bond, —(CH$_2$)$_r$—, —(CH$_2$O)$_s$—, —(OCH$_2$)$_t$—, —COO—, —OCO—, —S—, —S—S—, —(CH$_2$)$_u$—O—, —O—(CH$_2$)$_v$— or —O— (where r, s, t, u and v are integers, preferably integers from 1 to 12) and is bonded to the polymer main chain of the side-chain type polymer liquid crystal molecule. Since the side-chain type polymer liquid crystal molecules easily cause a variation in orientation by the photoisomeric molecule, regions having different slow axis directions or fast axis directions can be formed in the phase sheet sometimes by irradiating and sometimes by not irradiating light onto these regions.

The side-chain type polymer liquid crystal molecule may be synthesized by the dehydrating and condensing poly (meth)acrylate (ester) and the functional group expressed by Formula 5, for example. In this case, a dehydration condensation method used may be appropriately selected by those skilled in the art in accordance with the kind of the functional group used.

The polymer constituting the phase sheet of the present invention may contain a polymerizable resin in order to fix the orientation of the photoisomeric molecule or the like changing the slow axis direction or the fast axis direction of the phase sheet. Once the polymerizable resin has been polymerized so as to fix the orientation of the photoisomeric molecule upon the irradiation of light or heating, the polymerizable resin can prevent the photoisomeric molecule from causing an undesired structural isomerization even if the irradiation of light or heating is further performed. That is to say, the polymerizable resin can always hold fixed slow axis direction or fast axis direction stably in the phase sheet.

Examples of such a polymerizable resin include: a compound having an unsaturated bond; a compound having an electrophilic group; a compound having a nucleophilic group; and a compound having a polymerizable liquid crystal structure. However, the polymerizable resin is not particularly limited thereto.

Examples of the compound having an unsaturated bond include: a compound having an acrylate group; a compound having a methacrylate group; a compound having a vinyl group; and a compound having an acrylamide group. More specific examples of the compound having an unsaturated bond include methyl acrylate and ethyl methacrylate.

Examples of the compound having an electrophilic group include: a compound having an aldehyde group; a compound having an active ester group; a compound having an isocyanate group; a compound having an epoxy group; a compound having a trichloro triazine group; and a compound having a vinyl sulfone group. A more specific examples of the compound having an electrophilic group include the compound expressed by the following Formula 7:

[Formula 7]

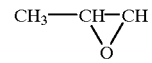

Examples of the compound having a nucleophilic group include: a compound having a hydroxyl group; a compound having an amino group; a compound having a sulfine group; and a compound having a phenolic hydroxyl group. A more specific example of the compound having a nucleophilic group include the compound expressed by the following Formula 8:

[Formula 8]

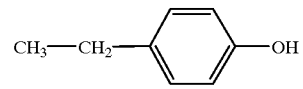

More specific examples of the compound having a polymerizable liquid crystal structure include the compounds expressed by the following Formula 9:

[Formula 9]

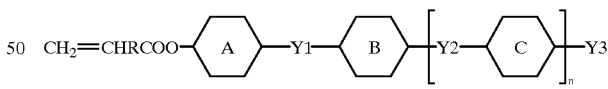

where the six-membered rings A, B and C are independently selected from the group consisting of the structures expressed by the following Formula 10:

[Formula 10]

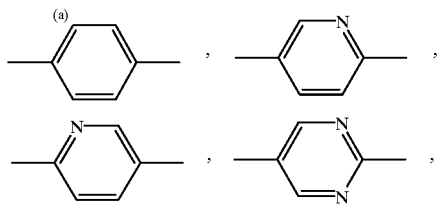

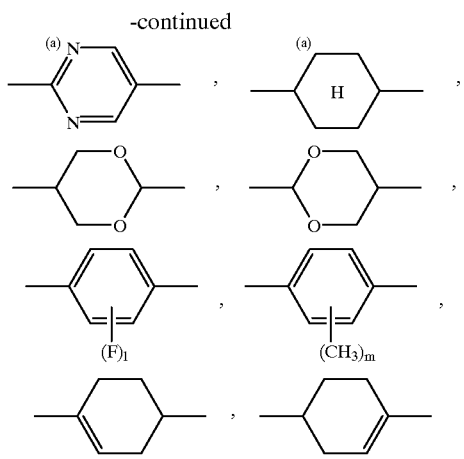

and where R is H or CH₃, n is 0 or 1, l and m are integers from 1 to 4. Considering heat resistance and retardation, the groups with the suffix (a) in Formula 10 are especially preferable for each of A, B and C. Y1 and Y2 are independently selected from the group consisting of a single bond, —CH₂CH₂—, —CH₂O—, —OCH₂—, —COO—, —OCO—, —C≡C—, —CH=CH—, —CF=CF—, —(CH₂)₄—, —CH₂CH₂CH₂O—, —OCH₂CH₂CH₂—, —CH₂=CHCH₂CH₂— and CH₂CH₂CH=CH—. Especially, —CH=CH— is preferable for each of Y1 and Y2. Y3 is a hydrogen atom; a halogen atom; a cyano group; or an alkyl group, an alkoxy group, an alkenyl group or an alkenyloxy group having 1 to 20 carbon atoms. Especially, a hydrogen atom or a fluorine atom is preferable for Y3.

The compound having the polymerizable liquid crystal structure may be synthesized, for example, by dehydrating and condensing poly(meth)acrylate (ester) and the functional group expressed by Formula 9. In this case, a dehydration condensation method used may be appropriately selected by those skilled in the art in accordance with the kind of the functional group used.

The polymerizable resin may be any of a polymer having a high degree of polymerization, a polymer having a low degree of polymerization and an oligomer. In each of these cases, the following advantageous can be attained respectively. First, if the polymerizable resin is a polymer having a high degree of polymerization, then the resulting phase sheet may be readily formed in a film shape. Second, if the polymerizable resin is a polymer having a low degree of polymerization, then the resulting phase sheet may maintain a heat resistance and the orientation of the photoisomeric molecule. Finally, if the polymerizable resin is an oligomer, the resulting phase sheet may maintain the orientation of the photoisomeric molecule.

The polymerizable functional group of the polymerizable resin is preferably bonded to the polymer constituting the phase sheet. Such a polymerizable functional group may be either a photopolymerizable functional group or a thermopolymerizable functional group.

Examples of preferable photopolymerizable functional groups of the polymerizable resin include an acrylate group, a methacrylate group, a vinyl group and an acrylamide group.

Examples of preferable thermopolymerizable functional groups of the polymerizable resin include an epoxy group and an isocyanate group.

The polymerizable resin may be contained preferably in the range of about 1 wt % to about 50 wt %, more preferably in the range from about 5 wt % to about 20 wt % depending upon the total weight of the phase sheet.

In the case where the compound having an unsaturated bond is used as the polymerizable resin, either a photopolymerization initiator or a thermo-polymerization initiator may be used in order to polymerize the polymerizable resin. Examples of the photopolymerization initiator include a benzoin class, a benzophenone class, an acetophenone class, and a thioxanthone class. Examples of the thermopolymerization initiators include an azo compound, an organic peroxide, an inorganic peroxide and sulfinic acid.

In the case where the compound having an unsaturated bond is a photopolymerizable resin, a photo-polymerization reaction can be caused by performing a light irradiation process on a pretreatment sheet to be described later. As a result, it is no longer necessary to provide an extra process step of fixing an orientation in order to polymerize the polymerizable resin. On the other hand, in the case where the compound having an unsaturated bond is a thermopolymerizable resin, all the slow axis directions or all the fast axis directions of the entire phase sheet can be fixed at a single time. As a result, it is possible to suppress the variations in orientations which are caused depending upon the position in the phase sheet when the orientations are fixed.

In the case where the compound having an electrophilic group or the compound having a nucleophilic group is used as the polymerizable resin, a reaction is preferably performed using a compound having a predetermined amount of an electrophilic group or a compound having a predetermined amount of nucleophilic group, respectively, in order to polymerize the polymerizable resin.

Furthermore, even in the case where the compound having a polymerizable liquid crystal structure is used as the polymerizable resin, the polymerizable resin may be polymerized by using a photoinitiator in the same way as described above. In this case, the polymerizable resin may also be oriented by the photoisomeric molecule, thereby further improving the degree of alignment of the resulting phase sheet.

The phase sheet of the present invention may be implemented not only as a so-called sheet but also as any of many other forms including a film, a membrane-shaped member, a plate-shaped member, and a coating applied on another support (such as a glass substrate). The thickness of the phase sheet of the present invention is preferably about 500 μm or less, more preferably about 100 μm or less, and most preferably about 20 μm or less.

Moreover, the phase sheet of the present invention preferably has a light transmittance of about 65%, more preferably about 80% or more. If the light transmittance becomes lower than 65%, then the resulting image to be displayed by a stereoscopic display device using such a phase sheet possibly becomes dark.

Furthermore, in order to improve the molding properties of the sheet, the phase sheet of the present invention may contain other substances such as polycarbonate, in addition to the photoisomeric molecule. Such a substance may be contained preferably in the range from about 1 wt % to about 70 wt % depending upon the total weight of the phase sheet.

Hereinafter, a method for fabricating the phase sheet of the present invention will be described.

First, a pretreatment sheet is formed from the mixture of the photoisomeric molecule, the polymer, and if necessary, the polymerizable resin. The pretreatment sheet may be molded by any of the known methods such as a solution flowing and extending method, a melting deposition method (melting extrusion method) and a application method. An optimum method used may be appropriately selected by those skilled in the art. For example, in the case of performing a melting deposition method, the mixture is melted at a predetermined temperature and then cast from a die to a cooling roller, thereby fabricating the pretreatment sheet.

As described above, the pretreatment sheet may be used even in the state of an un-oriented sheet. Alternatively, in order to further align the slow axis directions or the fast axis directions of the first and the second regions by performing a light irradiation process to be described later, the pretreatment sheet is preferably uniaxially oriented in a predetermined direction. The uniaxial orientation method is known to those skilled in the art and the conditions thereof (such as an magnification factor of orientation and the temperature during the orientation) may also be selected by those skilled in the art.

Next, light having an irradiation intensity distribution is irradiated onto the pretreatment sheet, thereby forming the first and the second regions having respectively different slow axis directions or fast axis directions.

The first and the second regions having respectively different slow axis directions or fast axis directions may be formed as phase difference regions in the phase sheet. The phase difference regions may be formed as light-irradiated regions and light-non-irradiated regions, for example, by selectively irradiating linearly polarized light onto the pretreatment sheet from a direction normal to the surface of the pretreatment sheet through a mask having a predetermined pattern.

The process of aligning the orientations of the photoisomeric molecules of the present invention with such linearly polarized light is analyzed as follows. For example, an azo pigment repeatedly and frequently undergoes cis-trans isomerization upon the irradiation of light or heating. If the irradiated light is linearly polarized light, the azo group oriented in a direction vertical or substantially vertical to the vibration direction thereof hardly absorbs light or does not absorb light at all. As a result, the orientation (i.e., the direction of the optic axis) of the azo group is substantially fixed at the location.

As a further specific example, a case where the photoisomeric molecule is azobenzene will be described with reference to FIG. 1.

As shown in FIG. 1, when linearly polarized ultraviolet light is irradiated in the direction substantially aligned with that of the light absorption axis of trans form azobenzene (A), a photoisomerization is caused to transform (A) into cis form azobenzene (B). (B) may be changed into trans form azobenzene (A) or (C) upon the irradiation of visible light or heating. Since the light absorption axis of trans form azobenzene (C) is substantially orthogonal to the axis of the linearly polarized light, (C) is stabilized without receiving any action from the light. As long as the light absorption axis of the azobenzene molecules is located within the plane orthogonal to the axis of the linearly polarized light, the molecules are stabilized with an equal possibility irrespective of the orientations of the molecules. Consequently, a photoisomeric molecule having an optic axis aligned with the polarization axis can be obtained.

Statistics show that if linearly polarized light is irradiated onto a sheet containing an azo pigment in an isotropic orientation state, the number of azo groups to be re-oriented in the direction vertical to the vibration direction of the linearly polarized light increases as the time passes. The re-orientation direction is a direction (on a plane) vertical to the vibration direction of the linearly polarized light. The azo groups are randomly oriented within the plane (a plane orientation state). After the re-orientation has been established, the azo groups are oriented within the plane orthogonal to the vibration direction of the incident linearly polarized light in the sheet. Thus, it is presumed that low birefringence is induced in the vertical direction (i.e., the vibration direction of the light).

The wavelength at which a photoisomerization is caused differs depending upon the kind of the photoisomeric molecule used. Thus, according to the present invention, a mercury lamp, a halogen lamp, a xenon lamp or the like having a wide wavelength range may be used as the light source for obtaining the linearly polarized light.

The intensity (illuminance) of the linearly polarized light to be irradiated greatly depends upon the quantum yield specific to the photoisomeric molecule and the temperature of the pretreatment sheet during the light irradiation, and thus may be appropriately selected in accordance with the pretreatment sheet used. The intensity of the visible light is preferably about 300 lux or more, more preferably about 3000 lux or more.

The temperature $S_t$ of the pretreatment sheet during the light irradiation is preferably set at the vicinity of the temperature Tg of the polymer, and more preferably is set so as to satisfy the relationship: $(Tg-40°\ C.)<S_t<(Tg+60°\ C.)$. If the light is irradiated onto the pretreatment sheet at a temperature extremely lower than the temperature Tg of the polymers constituting the pretreatment sheet, then the molecular movement of the polymers is suppressed. Thus, in such a case, a satisfactory birefringence may not be obtained. Conversely, if the light is irradiated onto the pretreatment sheet at a temperature considerably higher than the temperature Tg of the polymers constituting the pretreatment sheet, then the molecular movement of the polymers because of the heat becomes significant. Thus, in such a case, a satisfactory birefringence may not be obtained.

The phase sheet of the present invention is fabricated in this way.

It is noted that when the polymerizable resin having a thermopolymerizable functional group is used, the phase sheet is subsequently heated to a predetermined temperature (e.g., 180° C.). By performing such a heating, the polymerizable resin is polymerized. Consequently, the slow axis directions or the fast axis directions of the phase sheet which have been oriented during the light irradiation process may be fixed.

Furthermore, depending upon the necessity, the photoisomeric molecule contained in the phase sheet is chemically deactivated, thereby improving the durability of the photoisomeric molecule contained in the phase sheet. The photoisomeric molecule used in the present invention causes an isomerization owing to the absorption of light. Thus, if the light irradiation is further continued, then the isomerization proceeds, so that the optical properties of the phase sheet, which has already realized desired optical properties, may be varied as the time passes. In order to prevent the isomerization from proceeding, the portions absorbing the light, i.e., the conjugated chain structure portions of azo groups, imino groups, vinyl groups or the like may be dissolved by a cleavage by means of oxidization or reduction reaction in accordance with a method known to those skilled in the art, or may be eluted out of the phase sheet so as to be chemically deactivated.

Hereinafter, a first embodiment of the stereoscopic display device of the present invention will be described.

Figure 2:
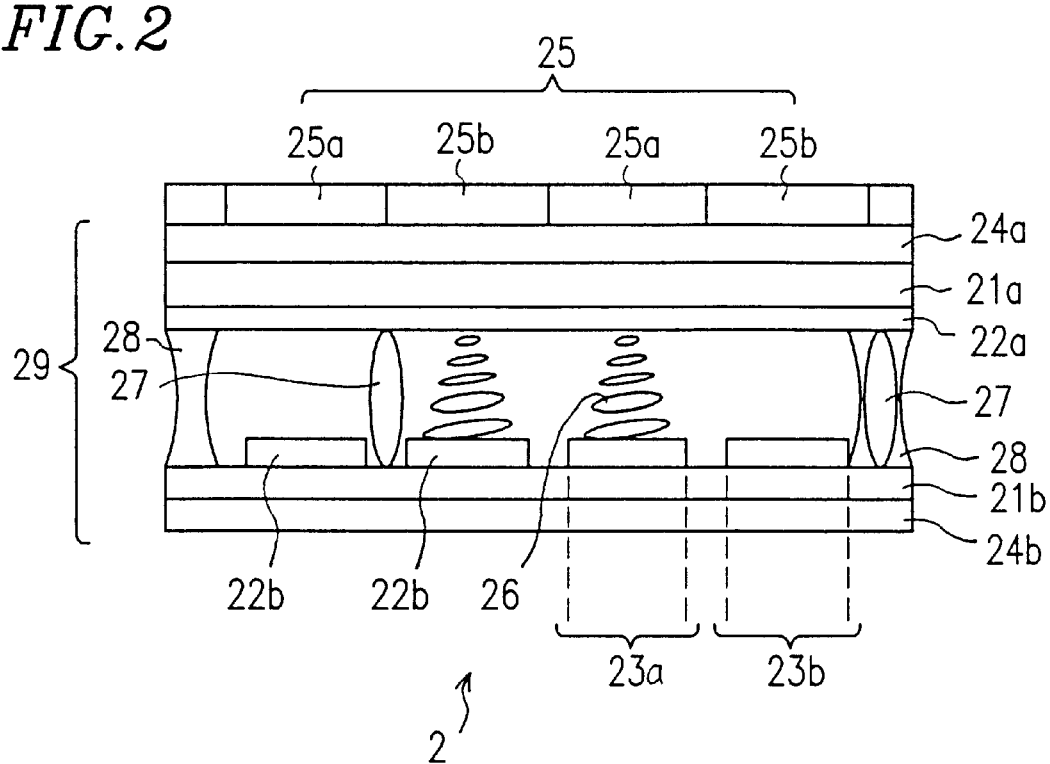
FIG. 2 is a cross-sectional view showing an example of the stereoscopic display device of the present invention.

FIG. 2 is a cross-sectional view showing an example of the stereoscopic display device of the present invention. As shown in FIG. 2, in the stereoscopic display device 2, a liquid crystal material 26 as a display medium is interposed between a pair of substrates 21a and 21b facing each other which may, for example, be a pair of transparent substrates made of glass, plastic or the like. The liquid crystal material 26 may be any of the liquid crystal materials for a TN mode, an STN mode, an ECB mode, a ferroelectric liquid crystal (FLC) mode, a light scattering mode, an axisymmetric orientation mode and the like which are applicable to conventional liquid crystal display devices. More specific examples of the liquid crystal materials include ZLI-4792 (manufactured by Merck & Co., Inc.) containing about 0.3% of a chiral agent (S-811). On the surface, facing the display medium, of each of the pair of substrates 21a and 21b, a plurality of stripe-shaped transparent electrodes 22a, 22b made of ITO (indium tin oxide) or the like are formed. The transparent electrodes 22a formed on one of the substrates 21a and the transparent electrodes 22b formed on the other substrate 21b cross each other (e.g., cross each other at a right angle in FIG. 2). A first region 25a and a second region 25b of a phase sheet 25 disposed over the substrate 21a via a polarizer 24a are located so as to correspond to pixels 23a and 23b, respectively. In each pixel, a pair of opposed transparent electrodes 22a and 22b cross each other. Over the surface, facing the display medium, of the transparent electrodes 22a and 22b, an electrically insulating film and an alignment film (neither is shown in FIG. 2) are formed in this order.

Figure 3:
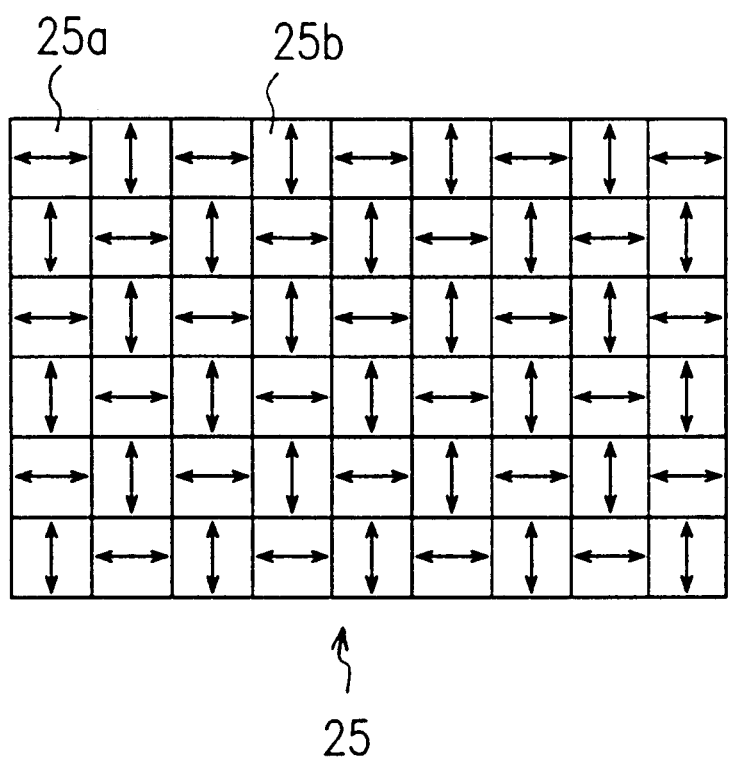
FIG. 3 is a schematic representation showing an exemplary arrangement of the first regions and the second regions having respectively different slow axis directions or fast axis directions in a phase sheet provided for the stereoscopic display device of the present invention.

FIG. 3 is a schematic representation showing an exemplary arrangement of the first regions 25a and the second regions 25b having respectively different slow axis directions or fast axis directions in the phase sheet provided for the stereoscopic display device of the present invention. As shown in FIG. 3, in the phase sheet 25, the first regions 25a and the second regions 25b are arranged in a lattice pattern such that each of these regions 25a and 25b corresponds to a single pixel in the stereoscopic display device. Alternatively, the first and the second regions may also be arranged in a stripe pattern such that each column of first or second regions corresponds to a single column of pixels in the stereoscopic display device. In this manner, the first and the second regions are arranged in a uniform pattern having a symmetry such that each of these regions correspond to at least one pixel in the stereoscopic display device.

The stereoscopic display device may be fabricated, for example, in the following manner.

First, stripe-shaped transparent electrodes 22a and 22b are formed by a sputtering method or the like on one surface of the substrate 21a and one surface of the substrate 21b, respectively. Each of the transparent electrodes is formed so as to have a predetermined size (e.g., width: about 280 $\mu$m; gap: about 20 $\mu$m; and thickness: about 70 nm).

Next, if necessary, electrically insulating films made of $SiO_2$ or the like are formed so as to respectively cover the transparent electrodes 22a and 22b. The thickness of the insulating film may be from about 50 nm to about 300 nm, more preferably from about 70 nm to about 100 nm.

Furthermore, if necessary, alignment films made of an organic material such as polyimide are formed over the electrically insulating films. The thickness of the alignment film may be from about 30 nm to about 200 nm, more preferably from about 50 nm to about 100 nm. The alignment film is subjected to a rubbing treatment by using cloth or nylon, for example. If such alignment films are formed, the stereoscopic display device of the present invention is applicable to a liquid crystal display device operating in a TN mode, an STN mode or the like. On the other hand, if such alignment films are not formed, the stereoscopic display device of the present invention is applicable to a liquid crystal display device operating in an axisymmetric orientation mode or the like.

Thereafter, the pair of substrates 21a and 21b thus fabricated are opposed to each other such that the stripe-shaped transparent electrodes 22a and 22b cross each other (e.g., at a right angle in FIG. 2). Then, the end portions of the substrates 21a and 21b are attached to each other via a seal member 28 after spacers 27 have been introduced into the gap between the substrates 21a and 21b. In this process step, a part of the periphery of each of the substrates 21a and 21b is left open as injection holes (not shown). It is noted that the transparent electrodes 22a and 22b disposed on the substrates 21a and 21b have only to cross each other, and are not necessarily required to be orthogonal to each other.

Subsequently, the liquid crystal material 26 is injected through the injection holes into the gap between the pair of substrates 21a and 21b. In injecting the liquid crystal material 26, a known vacuum injection method may be used. After the injection, the injection holes are sealed with an ultraviolet curable resin, a double-fluid mixture type adhesive, an instantaneous adhesive, a visible light curable resin or the like, thereby fabricating a liquid crystal cell 29.

Finally, the polarizers 24a and 24b are disposed over the surfaces of the pair of substrates 21a and 21b of the liquid crystal cell 29 which are opposite to the surfaces thereof facing the display medium, and the phase sheet(s) 25 is/are disposed over at least one of the polarizers 24a and 24b. The stereoscopic display device according to the first embodiment of the present invention is fabricated in this manner.

In the first embodiment of the stereoscopic display device of the present invention, the phase sheet(s) is/are disposed over at least one of the surfaces of the liquid crystal cell which are opposite to the surfaces thereof facing the display medium. Alternatively, the phase sheet(s) may be provided on at least one of the opposed surfaces of the substrates in contact with the liquid crystal material. In such a case, a substrate exhibiting an isotropy no longer exists between the liquid crystal material and the phase sheet. Consequently, a stereoscopic display device enhancing the stereoscopic impression of the viewer is realized, because the right-eye image component and the left-eye component can be separated more definitely.

Furthermore, if necessary, a phase film known to those skilled in the art is also provided, thereby compensating for a color tone and enlarging the viewing angle.

Next, a second embodiment of the stereoscopic display device of the present invention will be described.

Figure 4:
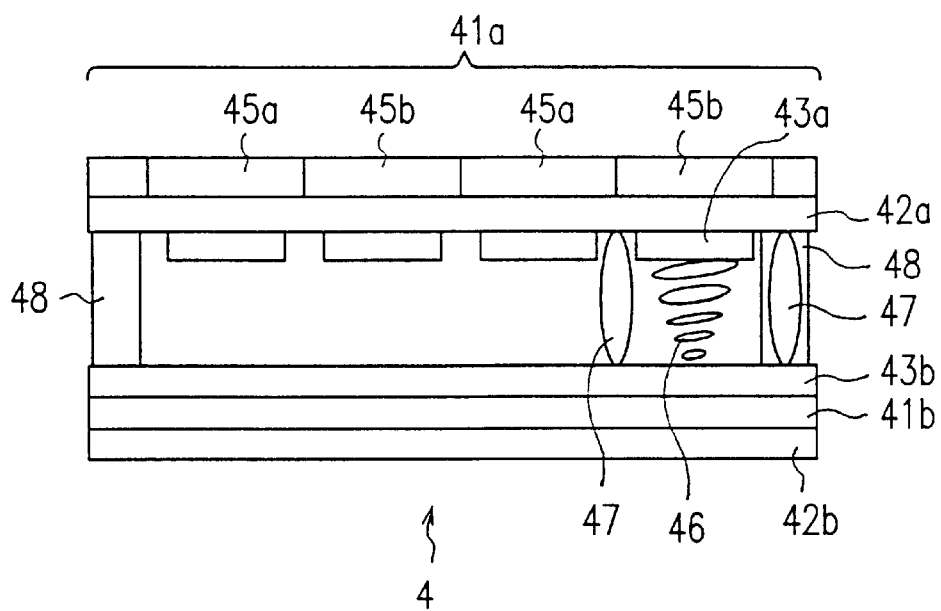
FIG. 4 is a cross-sectional view showing another example of the stereoscopic display device of the present invention.

FIG. 4 is a cross-sectional view showing another example of the stereoscopic display device of the present invention. As shown in FIG. 4, in the stereoscopic display device 4, one substrate (e.g., a substrate 41a) has two types of phase difference regions (i.e., first and the second regions 45a and 45b) having respectively different slow axis directions or fast axis directions, and a liquid crystal material 46 as a display medium is interposed between the pair of substrates 41a and 41b facing each other. The liquid crystal material 46 may be any of the liquid crystal materials for a TN mode, an STN mode, an ECB mode, an FLC mode, a light scattering mode, an axisymmetric orientation mode or the like applicable to conventional liquid crystal display devices. More specific examples of the liquid crystal materials include ZLI-4792 (manufactured by Merck & Co., Inc.) containing about 0.3% of a chiral agent (S-811).

The substrate 41a may be a substrate having sufficient degrees of rigidity and transparency and including a phase film which is made of the main-chain type polymer liquid crystal material for example and has been applied on a transparent substrate made of glass, plastic or the like by a spin coating method, a roll coating method or the like. On the other hand, in the case of fabricating a transmission type stereoscopic liquid crystal display device, the substrate 41b may be a transparent substrate made of glass, plastic or the like. However, in the case of fabricating a reflective stereoscopic liquid crystal display device or the like, the substrate 41b is not necessarily required to be transparent, but may be a metal film or the like.

A polarization layer 42a is provided on the surface, facing the display medium (i.e., an opposed surface), of at least one 41a of the pair of substrates 41a and 41b. The polarization layer 42a may be either a conventional polarizer or a polarizer described in Japanese Laid-Open Publication No. 7-261024. On the other hand, another polarization layer 42b is provided on the surface, opposite to the opposed surface, of the substrate 41b.

On the surface, facing the display medium, of each of the pair of substrates 41a and 41b, a plurality of stripe-shaped transparent electrodes 43a, 43b made of ITO or the like are formed. The transparent electrodes 43a formed on one of the substrates 41a and the transparent electrodes 43b formed on the other substrate 41b cross each other (e.g., cross each other at a right angle in FIG. 4). The portions where the opposed transparent electrodes 43a and 43b overlap each other correspond to the pixels. The first regions 45a and the second regions 45b, having respectively different slow axis directions or fast axis directions, in the substrate 41a are arranged in a uniform pattern having a symmetry such that each of these regions corresponds to at least one pixel (i.e., the overlapping region between a pair of opposed transparent electrodes 43a and 43b).

Over the surface, facing the display medium, of the transparent electrodes 43a, 43b of each substrate 41a, 41b, an electrically insulating film and an alignment film (neither is shown in FIG. 4) are formed in this order.

The stereoscopic display device may be fabricated, for example, in the following manner.

First, a polarizing film as a polarization layer 42a is attached to the surface, facing the display medium (i.e., the opposed surface), of the substrate 41a having two types of phase difference regions (the first and the second regions 45a, 45b), the slow axis directions or fast axis directions of which are different from each other by about 90 degrees, for example. Another polarizing film as the polarization layer 42b is attached to the surface, opposite to the opposed surface, of the substrate 41b. In this case, the transmission axis direction of the polarization layer 42a and the slow axis directions or the fast axis directions of the substrate 41a are adjusted to be respectively predetermined directions. Next, stripe-shaped transparent electrodes 43a and 43b are formed by a sputtering method or the like over the substrates 41a and 41b, respectively. Each of the transparent electrodes is formed so as to have a predetermined size (e.g., width: about 280 $\mu$m; gap: about 20 $\mu$m; and thickness: about 70 nm). In this case, the positions of the stripe-shaped transparent electrodes 43a and 43b are adjusted such that the respective pixels correspond to the regions 45a and 45b of the substrate 41a having respectively different slow axis directions or fast axis directions.

Next, if necessary, electrically insulting films made of $SiO_2$ or the like are formed so as to respectively cover the transparent electrodes 43a and 43b. The thickness of the insulating film may be from about 50 nm to about 300 nm, more preferably from about 70 nm to about 100 nm.

Furthermore, if necessary, alignment films made of an organic material such as polyimide are formed over the electrically insulting films. The thickness of the alignment film may be from about 30 nm to about 200 nm, more preferably from about 50 nm to about 100 nm. The alignment film is subjected to a rubbing treatment by using cloth or nylon, for example. If such alignment films are formed, the stereoscopic display device of the present invention is applicable to a liquid crystal display device operating in a TN mode, an STN mode or the like. On the other hand, if such alignment films are not formed, the stereoscopic display device of the present invention is applicable to a liquid crystal display device operating in an axisymmetric orientation mode or the like.

Thereafter, the pair of substrates 41a and 41b thus fabricated are opposed to each other such that the stripe-shaped transparent electrodes 43a and 43b cross each other (e.g., at a right angle in FIG. 4). Then, the end portions of the substrates 41a and 41b are attached to each other via a seal member 48 after spacers 27 have been introduced into the gap between the substrates 41a and 41b. In this process step, a part of the periphery of each of the substrates 41a and 41b is left open as injection holes (not shown). It is noted that the transparent electrodes 43a and 43b disposed on the substrates 41a and 41b have only to cross each other, and are not necessarily required to be orthogonal to each other.

Subsequently, the liquid crystal material 46 is injected through the injection holes into the gap between the pair of substrates 41a and 41b. In injecting the liquid crystal material 46, a known vacuum injection method may be used. After the injection, the injection holes are sealed with an ultraviolet curable resin, a double-fluid mixture type adhesive, an instantaneous adhesive, a visible light curable resin or the like.

Furthermore, in the case of fabricating a reflective stereoscopic liquid crystal display device, a reflector may be provided for one of the substrates. Moreover, if necessary, a phase film known to those skilled in the art is provided, thereby compensating for a color tone and enlarging a viewing angle. The stereoscopic display device according to the second embodiment of the present invention is fabricated in this manner.

The stereoscopic display device according to the first and the second embodiments may use a liquid crystal display device, for which any of the drive methods and any of the display modes, other than the drive method and the TN display mode of a liquid crystal display device performing a display operation by a simple matrix drive, are used in combination. For example, a liquid crystal display device performing a display operation by an active matrix drive using active elements such as TFTs (thin film transistors) or MIM (metal-insulator-metal) elements is applicable. The drive method used in the present invention is not particularly limited.

According to the present invention, by using color filters or a black matrix, a stereoscopic display device allowing for a color display may be fabricated. Furthermore, the present invention is similarly applicable to a stereoscopic display device using a liquid crystal panel including a liquid crystal material for an STN mode, an FLC mode, an ECB mode, a light scattering mode or the like other than the TN mode. Moreover, the present invention is also applicable to a stereoscopic display device using either a transmission type liquid crystal panel or a reflective liquid crystal panel.

The material of the substrates used for the stereoscopic display device of the present invention is not particularly limited. An arbitrary light-transmissive transparent material such as glass, plastic or the like may be used. Furthermore, if one of the pair of substrates is transparent, a metal film or the like may be used as the other substrate.

Next, the reasons why the polarization direction of polarized light outgoing from a right-eye pixel is different from the polarization direction of polarized light outgoing from a left-eye pixel in the phase sheet of the present invention will be described with reference to FIG. 5.

If the polarization axis direction of incident light is different from the slow axis direction or the fast axis direction of a phase sheet, a phase shift is caused between the component of the incident light in the slow axis direction or in the fast axis direction and the component in the direction orthogonal thereto.

Figure 5:
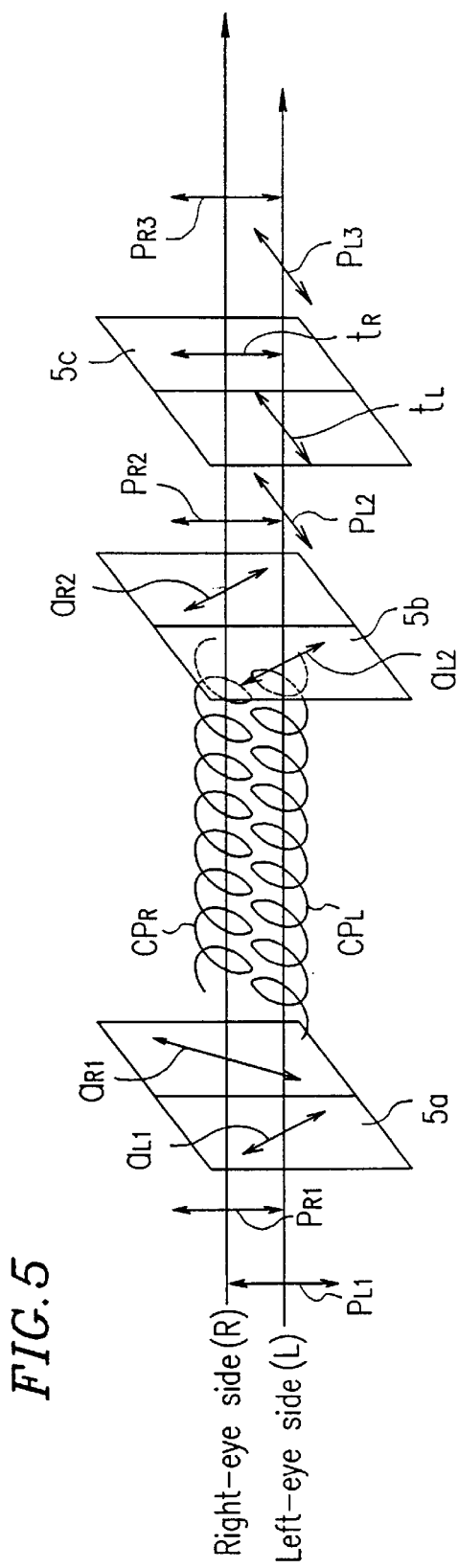
FIG. 5 is a schematic representation illustrating that if the polarization axis direction of incident light is different from the slow axis direction or the fast axis direction of the phase sheet of the present invention, a phase shift is caused between the component of the incident light in the slow axis direction or the fast axis direction and the component in the direction orthogonal thereto.

For example, if incident light, of which the right-eye (R) polarization axis $P_{R1}$ is parallel to the left-eye (L) polarization axis $P_{L1}$ thereof, is passed through a phase sheet 5a of which the right-eye slow axis direction or fast axis direction $a_{R1}$ is different from the left-eye slow axis direction or fast axis direction $a_{L1}$ thereof by 90 degrees, circularly polarized light beams $CP_R$ and $CP_L$ having mutually inverse rotatory directions are obtained, as shown in FIG. 5.

Next, these circularly polarized light beams $CP_R$ and $CP_L$ are passed through a phase sheet 5b for polarization spectacles, in which the right-eye slow axis direction or fast axis direction $a_{R2}$ is parallel to the left-eye slow axis direction or fast axis direction $a_{L2}$ and is orthogonal to the right-eye slow axis direction or fast axis direction $a_{R1}$ of the phase sheet 5a. Then, since the slow axis directions or the fast axis directions of the phase sheet 5a and the phase sheet 5b for polarization spectacles are orthogonal to each other on the side of the right eye, the phases which are shifted from each other by a quarter wavelength are offset by each other. Consequently, linearly polarized light having a polarization axis $P_{R2}$ parallel to the polarization axis $P_{R1}$ of the incident light is obtained.

On the other hand, on the side of the left eye, the passage of the circularly polarized light $CP_L$ through the phase sheet 5b for polarization spectacles causes a phase shift of a quarter wavelength. Consequently, linearly polarized light having a polarization axis $P_{L2}$ orthogonal to the polarization axis $P_{L1}$ of the incident light is obtained.

Next, these linearly polarized light beams are passed through a polarizing film 5c for polarization spectacles having transmission axes $t_R$ and $t_L$. Then, on the side of the right eye, outgoing light having a polarization axis $P_{R3}$ parallel to the polarization axis $P_{R1}$ of the incident light is obtained. On the other hand, on the side of the left eye, outgoing light having a polarization axis $P_{L3}$ orthogonal to the polarization axis $P_{L1}$ of the incident light is obtained.

Consequently, the right eye can see only the image component from a right-eye pixel with respect to the right-eye outgoing light, and the left eye can see only the image component from a left-eye pixel with respect to the left-eye outgoing light. In this case, since the transmission axes $t_R$ and $t_L$ of the polarizing film 5c are matched with the polarization axes $P_{R2}$ and $P_{L2}$ of the linearly polarized light beams, an image having a high contrast ratio from which no transmitted light has been lost can be viewed. Furthermore, it is no longer necessary to dispose polarizers such that a Normally White mode and a Normally Black mode respectively correspond to the right and the left eyes. Thus, a stereoscopic display device allowing for the display of balanced image components for the right and the left eyes is realized. As a result, when a viewer takes off the polarization spectacles, the viewer can observe a normal two-dimensional image.

Hereinafter, specific examples of the present invention will be described. It is noted that the present invention is not limited to the following examples.

EXAMPLE 1

Polyethylene terephthalate having an average molecular weight of about 20000 relative to standard styrene molecular weight and the photoisomeric molecule expressed by the following Formula 11:

[Formula 11]

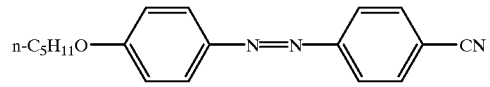

were mixed at a weight ratio of about 90:10 and dissolved in methylene chloride, thereby preparing a 30 wt % of solution. The solution was applied onto a glass plate by using a spatula and dried, thereby obtaining a pretreatment sheet having a thickness of about 15 μm.

Figure 6A:
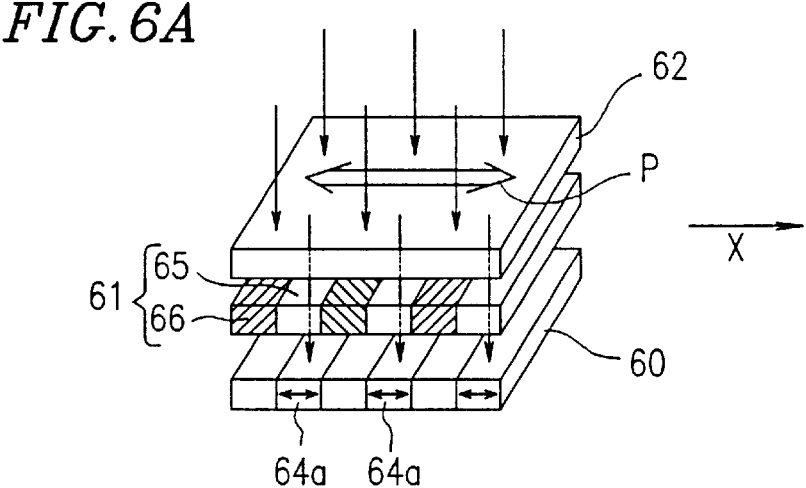
FIGS. 6A through 6C are schematic representations illustrating process steps of irradiating the pretreatment sheet used in the present invention with polarized light.
Figure 6B:
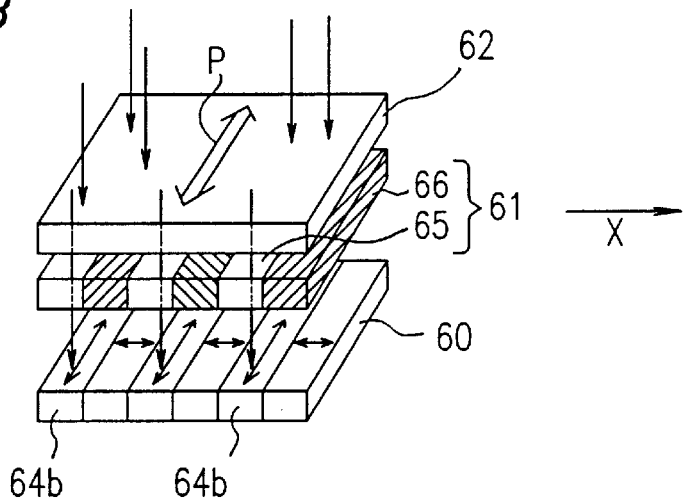
Figure 6C:
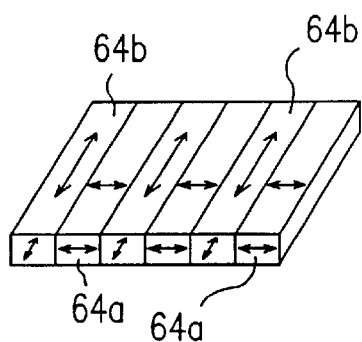

Next, polarized light was irradiated onto the pretreatment sheet as shown in FIGS. 6A through 6C.

First, as shown in FIG. 6A, a photomask 61 in which light transmissive portions 65 and light non-transmissive portions 66 were alternately provided in a stripe pattern, was disposed over the pretreatment sheet 60, and a polarizer 62 was further disposed over the photomask 61 such that the polarized light transmission axis P thereof became parallel to a direction X. Next, ultraviolet light (the irradiation intensity thereof at a wavelength of about 365 nm was about 3 mW/m$^2$) was irradiated onto the polarizer 62 in a thermostat for about 30 minutes at about 60° C. As a result, the first regions 64a having a slow axis direction or a fast axis direction parallel to the polarized light transmission axis P were obtained in the pretreatment sheet 60 so as to correspond to the light transmissive portions 65 of the photomask 61.

Next, as shown in FIG. 6B, the photomask 61 was moved such that the light non-transmissive portions 66 of the photomask 61 overlapped the first regions 64a of the pretreatment sheet 60, and the polarizer 62 was further disposed over the photomask 61 such that the polarized light transmission axis P thereof became orthogonal to the direction X. Next, ultraviolet light was irradiated onto the polarizer 62 in the same way as that described above. As a result, the second regions 64b having a slow axis direction or a fast axis direction parallel to the polarized light transmission axis P were obtained in the pretreatment sheet 60 so as to correspond to the light transmissive portions 65 of the photomask 61.

In this manner, a phase sheet, in which the slow axis direction or the fast axis direction of the first regions 64a was orthogonal to the counterpart of the second regions 64b as shown in FIG. 6C, was fabricated. In this example, the polarization axis directions of the first and the second regions are orthogonal to each other in the phase sheet. However, these directions are not necessarily required to be orthogonal to each other. Moreover, by making the vibration directions of the polarized light beams irradiated onto the first and the second regions orthogonal to each other, the slow axis directions or the fast axis direction of the first and the second regions may be orthogonal to each other and circularly polarized light beams in which the phases of the two types of polarized light beams passed through these regions are different from each other by 90 degrees may be generated.

As the refractive indices of the first and the second regions of the resulting phase sheet, a refractive index (A) in a direction parallel to a polarization axis direction $a_1$ of the light irradiated onto the first region 71 and a refractive index (B) in a direction parallel to a polarization axis direction $b_1$ of the light irradiated onto the second region 72 were measured (herein, it is assumed that the polarization axis direction $b_1$ is orthogonal to the polarization axis direction $a_1$) and the heat resistance temperature of the phase sheet was also measured. The results of these measurements are shown below Table 1.

EXAMPLE 2

The main-chain type polymer liquid crystal material which had an average molecular weight of about 20000 relative to standard styrene molecular weight and is expressed by the following Formula 12:
[Formula 12]

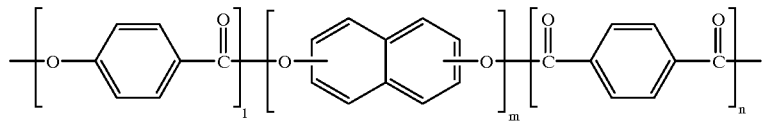

(where l:m:n is 1:1:1).
and the photoisomeric molecule expressed by Formula 11 were mixed at a weight ratio of about 80:20, heated and melted, thereby obtaining a pretreatment sheet having a thickness of about 30 μm by a T die casting method in which the casting temperature was set at about 230° C.

Next, ultraviolet polarized light was irradiated onto the pretreatment sheet in the same way as in the first example, except that the temperature of the pretreatment sheet was set at 180° C., thereby fabricating a phase sheet in which the slow axis directions or the fast axis directions of the first and the second regions were orthogonal to each other.

The measurement results about the refractive indices of the first and the second regions of the phase sheet thus obtained and the heat resistance temperature of the phase sheet are shown below in Table 1. As can be understood from Table 1, a higher birefringence than that of the first example was obtained by using the main-chain type polymer liquid crystal material. The refractive index of the phase sheet was further measured after the phase sheet had been heated at about 100° C. for about 24 hours. The refractive index thereof after the heating was not different from that before the heating.

In this example, the photoisomeric molecule was simply mixed with the main-chain type polymer liquid crystal material. However, if necessary, the photoisomeric molecule may be bonded to the side-chain portion of the main-chain type polymer liquid crystal material. By bonding the photoisomeric molecule to the side-chain portion, the structural change of the photoisomeric functional group becomes more likely to influence on the main chain having a liquid crystal structure. As a result, the degree of alignment of the entire polymer is improved.

EXAMPLE 3

A pretreatment sheet having a thickness of about 30 μm was obtained in the same way as in the second example, except that a side-chain type polymer liquid crystal material which had an average molecular weight of about 15000 relative to standard styrene molecular weight and is expressed by the following Formula 13:

[Formula 13]

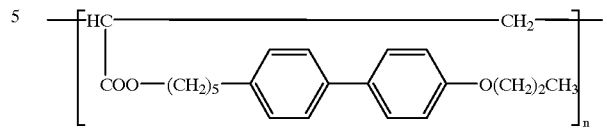

(where n is an integer).

and the photoisomeric molecule expressed by Formula 11 were mixed at a weight ratio of about 80:20 and the casting temperature was set at about 130° C.

Next, ultraviolet polarized light was irradiated onto the pretreatment sheet in the same way as in the first example, except that the temperature of the pretreatment sheet was set at about 80° C., thereby fabricating a phase sheet in which the slow axis directions or the fast axis directions of the first and the second regions were orthogonal to each other.

The measurement results about the refractive indices of the first and the second regions of the phase sheet thus obtained and the heat resistance temperature of the phase sheet are shown below in Table 1. As can be understood from Table 1 a higher birefringence than that of the main-chain type liquid crystal material of the second example was obtained by using the side-chain type polymer liquid crystal material.

In this example, the photoisomeric molecule was simply mixed with the side-chain type polymer liquid crystal material. However, if necessary, the photoisomeric molecule may be bonded to the side-chain portion of the side-chain type polymer liquid crystal material. By bonding the photoisomeric molecule to the side-chain portion, the structural change of the photoisomeric functional group becomes more likely to influence on the side chain having a liquid crystal structure. As a result, the degree of alignment of the entire polymer is improved.

EXAMPLE 4

A diluted solution was prepared such that the polymer, which was bonded to the photoisomeric functional group of a photoisomeric molecule, had an average molecular weight of about 18000 relative to standard styrene molecular weight and is expressed by the following Formula 14:
[Formula 14]

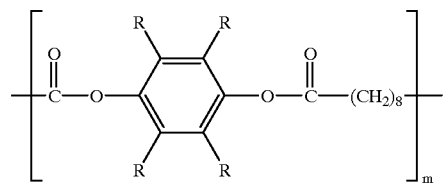

(where R is expressed by the following Formula 15

[Formula 15]

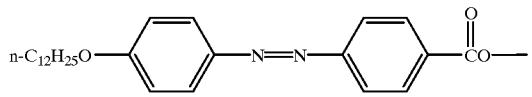

and m is an integer) became 40 wt % with ethylcellosolve acetate. The diluted solution was spin coated onto a glass substrate and dried, thereby obtaining a pretreatment sheet having a thickness of about 20 μm.

Next, ultraviolet polarized light was irradiated onto the pretreatment sheet in the same way as in the first example, except that the temperature of the pretreatment sheet was set at about 60° C., thereby fabricating a phase sheet in which the slow axis directions or the fast axis directions of the first and the second regions were orthogonal to each other.

The measurement results about the refractive indices of the first and the second regions of the phase sheet thus obtained and the heat resistance temperature of the phase sheet are shown below in Table 1. As can be understood from Table 1, a sufficient birefringence was obtained by using the polymer.

EXAMPLE 5

The photoisomeric molecule expressed by Formula 11, a thermopolymerizable resin which had an average molecular weight of about 20000 relative to standard styrene molecular weight and is expressed by the following Formula 16:

[Formula 16]

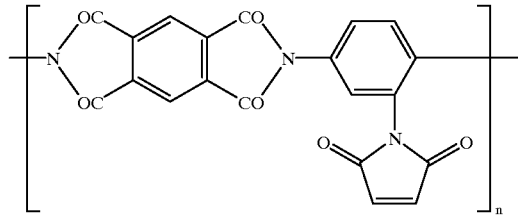

(where n is an integer).
and a thermopolymerizable resin expressed by the following Formula 17:

[Formula 17]

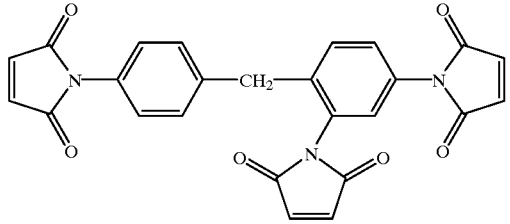

were mixed at a weight ratio of about 10:60:30, and a diluted solution was prepared such that the concentration of the mixture became 40 wt % by using ethylcellosolve acetate. The diluted solution was spin coated onto a glass substrate and dried, thereby obtaining a pretreatment sheet having a thickness of about 15 μm.

Next, ultraviolet polarized light was irradiated onto the pretreatment sheet in the same way as in the first example, except that the temperature of the pretreatment sheet was set at about 60° C., thereby obtaining a sheet in which the slow axis directions or the fast axis directions of the first and the second regions were orthogonal to each other. Then, in order to polymerize the thermopolymerizable resins, the sheet was further heated at about 180° C. for about 30 minutes. Thereafter, the sheet was left to be cooled down to room temperature, thereby fabricating a phase sheet.

The measurement results about the refractive indices of the first and the second regions of the phase sheet thus obtained and the heat resistance temperature of the phase sheet are shown below in Table 1. As can be understood from Table 1, a phase sheet having a sufficient heat resistance was obtained by using the thermopolymerizable resins.

In this example, a known thermopolymerization initiator may be added when the thermopolymerizable resins are mixed.

EXAMPLE 6

The polymer which was bonded to the photoisomeric functional group of the photoisomeric molecule, had an average molecular weight of about 20000 relative to standard styrene molecular weight and is expressed by Formula 14; isobornyl methacrylate (a photopolymerizable resin); and Irgacure 651 (manufactured by Ciba Geigy, Inc.; a photo-polymerization initiator) were mixed at a weight ratio of about 90:8.5:1.5, and a diluted solution was prepared by using ethylcellosolve acetate such that the concentration of the mixture became about 35 wt %. The diluted solution was spin coated onto a glass substrate and dried, thereby obtaining a pretreatment sheet having a thickness of about 15 μm.

Next, ultraviolet polarized light was irradiated onto the pretreatment sheet in the same way as in the first example, except that the temperature of the pretreatment sheet was set at about 100° C., thereby fabricating a phase sheet in which the slow axis directions or the fast axis directions of the first and the second regions were orthogonal to each other.

The measurement results about the refractive indices of the first and the second regions of the phase sheet thus obtained and the heat resistance temperature of the phase sheet are shown below in Table 1. As can be understood from Table 1, a phase sheet having a sufficient heat resistance was obtained by using the photopolymerizable resin. In addition, the necessity of conducting a further heat treatment can be eliminated by using a photopolymerizable resin. Thus, the production yield can be improved.

In this example, the photopolymerizable resin was simply mixed. Alternatively, the photopolymerizable resin may be bonded to the side chain of the polymer. Furthermore, the photopolymerization initiator may also be bonded to the side chain of the polymer, if necessary.

EXAMPLE 7

The polymer which was bonded to the photoisomeric functional group of the photoisomeric molecule, had an average molecular weight of about 20000 relative to standard styrene molecular weight and is expressed by Formula 14, the photo-polymerizable liquid crystal material expressed by the following Formula 18:

[Formula 18]

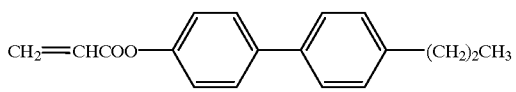

and Irgacure 651 (manufactured by Ciba Geigy, Inc.; a photopolymerization initiator) were mixed at a weight ratio of about 80:18:2, and a diluted solution was prepared by using ethylcellosolve acetate such that the concentration of the mixture became about 40 wt %. The diluted solution was spin coated onto a glass substrate and dried, thereby obtaining a pretreatment sheet having a thickness of about 15 µm.

Next, ultraviolet polarized light was irradiated onto the pretreatment sheet in the same way as in the first example, except that the temperature of the pretreatment sheet was set at about 100° C., thereby fabricating a phase sheet in which the slow axis directions or the fast axis directions of the first and the second regions were orthogonal to each other.

The measurement results about the refractive indices of the first and the second regions of the phase sheet thus obtained and the heat resistance temperature of the phase sheet are shown below in Table 1. As can be understood from Table 1, the phase sheet thus obtained had a sufficient birefringence and a sufficient heat resistance.

EXAMPLE 8

The polymer which had an average molecular weight of about 20000 relative to standard styrene molecular weight and is expressed by the following Formula 19:
[Formula 19]

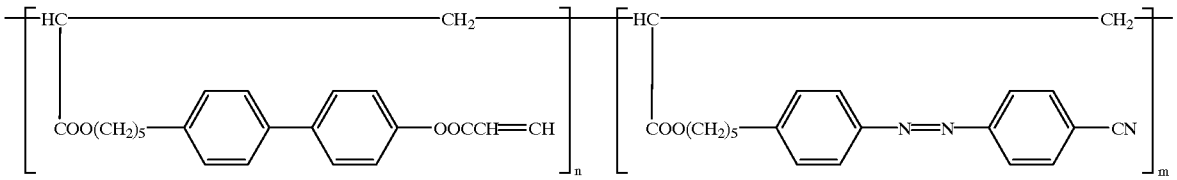

was dissolved in methylene chloride, thereby preparing a 30 wt % of solution. The solution was applied onto a glass plate by using a spatula and dried, thereby obtaining a pretreatment sheet having a thickness of about 15 µm. In the polymer, a polymerizable functional group and a photoisomeric functional group are bonded to the side chain of the polymer. In Formula 19, n was 45 and m was 12.

Next, ultraviolet polarized light was irradiated onto the pretreatment sheet in the same way as in the first example, except that the temperature of the pretreatment sheet was set at about 50° C., thereby fabricating a phase sheet in which the slow axis directions or the fast axis directions of the first and the second regions were orthogonal to each other.

The measurement results about the refractive indices of the first and the second regions of the phase sheet thus obtained and the heat resistance temperature of the phase sheet are shown below in Table 1. As can be understood from Table 1, the phase sheet thus obtained had a sufficient birefringence and a sufficient heat resistance.

EXAMPLE 9

The polymer which was bonded to the photoisomeric functional group of the photoisomeric molecule, had an average molecular weight of about 20000 relative to standard styrene molecular weight and is expressed by Formula 14 was heated and melted, and an un-oriented film was obtained by a T die casting method at a casting temperature of about 200° C. The un-oriented sheet was oriented sixfold by a tenter in the width direction thereof, thereby obtaining a uniaxially oriented pretreatment sheet having a thickness of about 30 µm.

Next, a polarizer was disposed over the pretreatment sheet via a photomask such that the orientation direction of the pretreatment sheet was aligned with the polarized light transmission axis of the polarizer, and ultraviolet polarized light was irradiated onto the pretreatment sheet in the same way as in the first example, thereby forming the first regions, having a slow axis direction or a fast axis direction parallel to the orientation direction, in the pretreatment sheet. Furthermore, the polarizer was disposed over the pretreatment sheet via the photomask such that the orientation direction of the pretreatment sheet crossed the polarized light transmission axis of the polarizer at a right angle, and ultraviolet polarized light was irradiated onto the pretreatment sheet in the same way as in the first example, thereby forming the second regions, having a slow axis direction or a fast axis direction vertical to the orientation direction, in the pretreatment sheet. A phase sheet was obtained in this manner. By disposing the polarizer in such a manner, the slow axis directions or the fast axis directions of the first and the second regions of the phase sheet thus obtained can be sufficiently different from each other.

The measurement results about the refractive indices of the first and the second regions of the phase sheet thus obtained and the heat resistance temperature of the phase sheet are shown below in Table 1. As can be understood from Table 1, the phase sheet thus obtained had a sufficient birefringence and a sufficient heat resistance.

In this example, only the polymer which was bonded to the photoisomeric functional group of the photoisomeric molecule was used. Alternatively, a main-chain type or a side-chain type polymer liquid crystal material may also be used. Moreover, a polymerizable resin such as a photopolymerizable resin and a thermopolymerizable resin may also be used. The polymerizable functional group of such a resin may be bonded to the side chain of the polymer.

TABLE 1

| | Refractive index | | | | Heat Resistance |
|---|---|---|---|---|---|
| | First Region | | Second Region | | Temper- |
| | A | B | A | B | ature (° C.) |
| Example 1 | 1.572 | 1.584 | 1.584 | 1.572 | 60 |
| Example 2 | 1.576 | 1.596 | 1.596 | 1.576 | 160 |
| Example 3 | 1.574 | 1.598 | 1.598 | 1.574 | 86 |
| Example 4 | 1.572 | 1.587 | 1.587 | 1.572 | 70 |
| Example 5 | 1.572 | 1.582 | 1.582 | 1.572 | 170 |
| Example 6 | 1.572 | 1.587 | 1.587 | 1.572 | 120 |
| Example 7 | 1.572 | 1.594 | 1.594 | 1.572 | 115 |

TABLE 1-continued

|  | Refractive index | | | | Heat Resistance |
| --- | --- | --- | --- | --- | --- |
|  | First Region | | Second Region | | Temperature (° C.) |
|  | A | B | A | B |  |
| Example 8 | 1.572 | 1.595 | 1.595 | 1.572 | 130 |
| Example 9 | 1.572 | 1.598 | 1.598 | 1.572 | 70 |

EXAMPLE 10

In this example, the stereoscopic display device 2 shown in FIG. 2 was fabricated.

First, the liquid crystal cell 29 was fabricated in the following manner.

The stripe-shaped transparent electrodes 22a and 22b made of ITO were formed by a sputtering method on one surface of the substrate 21a and one surface of the substrate 21b, respectively. The substrates 21a and 21b were made of glass. Each of the transparent electrodes was formed so as to have a width of about 280 μm, a gap of about 20 μm and a thickness of about 70 nm.

Next, electrically insulating films made of $SiO_2$ were formed so as to respectively cover the transparent electrodes 22a and 22b. The thickness of the insulating film was set at about 100 nm. Furthermore, alignment films made of polyimide were formed over the electrically insulating films so as to be about 60 nm thick. The alignment films were subjected to a rubbing treatment by using cloth of nylon.

Thereafter, the pair of substrates 21a and 21b thus fabricated were opposed to each other such that the stripe-shaped transparent electrodes 22a and 22b crossed each other at a right angle. Then, the end portions of the substrates 21a and 21b were attached to each other via a seal member 28 after spacers 27 had been introduced into the gap between the substrates 21a and 21b. In this process step, a part of the periphery of each of the substrates 21a and 21b was left open as injection holes (not shown).

Subsequently, ZLI-4792 (manufactured by Merck & Co., Inc.) containing about 0.3% of a chiral agent (S-811) was injected as a liquid crystal material 26 through the injection holes into the gap between the pair of substrates 21a and 21b in accordance with a known vacuum injection method under an environment in which the temperature was about 25° C. and the humidity was about 20%. After the injection, the injection holes were sealed with an ultraviolet curable resin, thereby fabricating the liquid crystal cell 29.

Furthermore, polarizers 24a and 24b were formed over the surfaces of the pair of substrates 21a and 21b of the liquid crystal cell 29 which were opposite to the surfaces thereof facing the display medium.

Next, the phase sheet 25 shown in FIG. 3 was obtained in the same way as in the first example, except that a photomask, in which light transmissive portions and light non-transmissive portions, each having a size corresponding to a single pixel, were arranged in a lattice pattern, was used. It is noted that the photomask used herein, in which light transmissive portions and light non-transmissive portions are arranged in a lattice pattern, may be used as the pretreatment sheet obtained in any of the second to the ninth examples.

Figure 8:
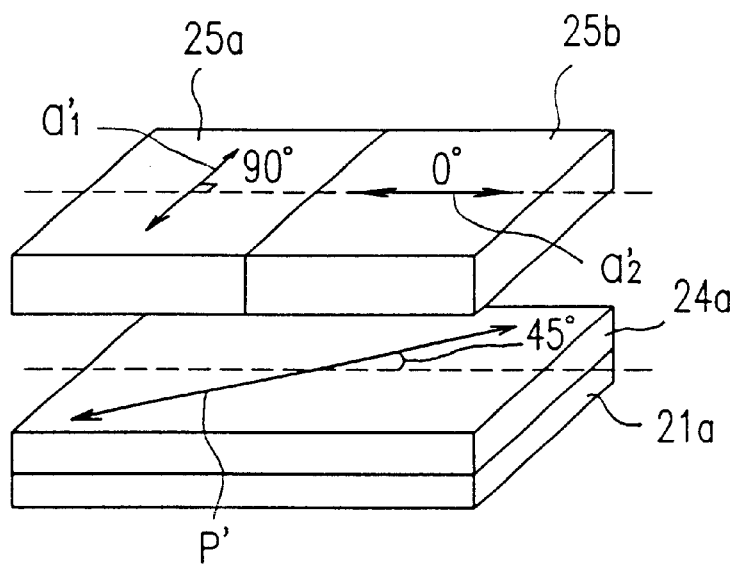
FIG. 8 is a schematic representation illustrating an exemplary arrangement of a phase sheet and a polarizer in the first embodiment of the stereoscopic display device of the present invention.

The phase sheet 25 thus obtained was disposed over the polarizer 24a of the liquid crystal cell 29 such that neither the slow axis direction or the fast axis direction $a'_1$ of the first region 25a of the phase sheet 25 or the slow axis direction or the fast axis direction $a'_2$ of the second region 25b thereof became parallel to the polarized light transmission axis P' of the polarizer 24a as shown in FIG. 8, thereby fabricating the stereoscopic display device 2.

A right-eye signal and a left-eye signal were respectively transmitted to a pixel corresponding to the first region and a pixel corresponding to the second region of the stereoscopic display device thus fabricated, thereby displaying an image. The image was observed with a pair of spectacles provided with a circular polarizer obtained by attaching a phase sheet and a polarizer to each other. In the phase sheet, the slow axis direction or fast axis direction of the region for the right eye was different from the counterpart of the region for the left eye by 90 degrees. The polarizer had a transmission axis direction different from any of the slow axis directions or the fast axis directions of the phase sheet. As a result, the image was observed as a stereoscopic image.

EXAMPLE 11

In this example, the stereoscopic display device 4 shown in FIG. 4 was fabricated.

First, the substrate 41a having the first regions 45a and the second regions 45b on a glass plate was fabricated in the same way as in the second example, except that the photomask used in the tenth example was substituted for the photomask of the second example.

Figure 9:
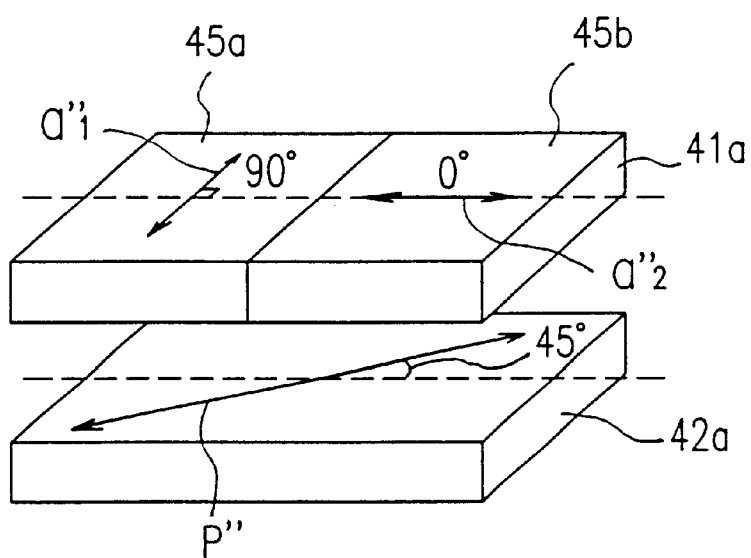
FIG. 9 is a schematic representation illustrating an exemplary arrangement of a phase sheet and a polarizer in the second embodiment of the stereoscopic display device of the present invention.
Figure 10:
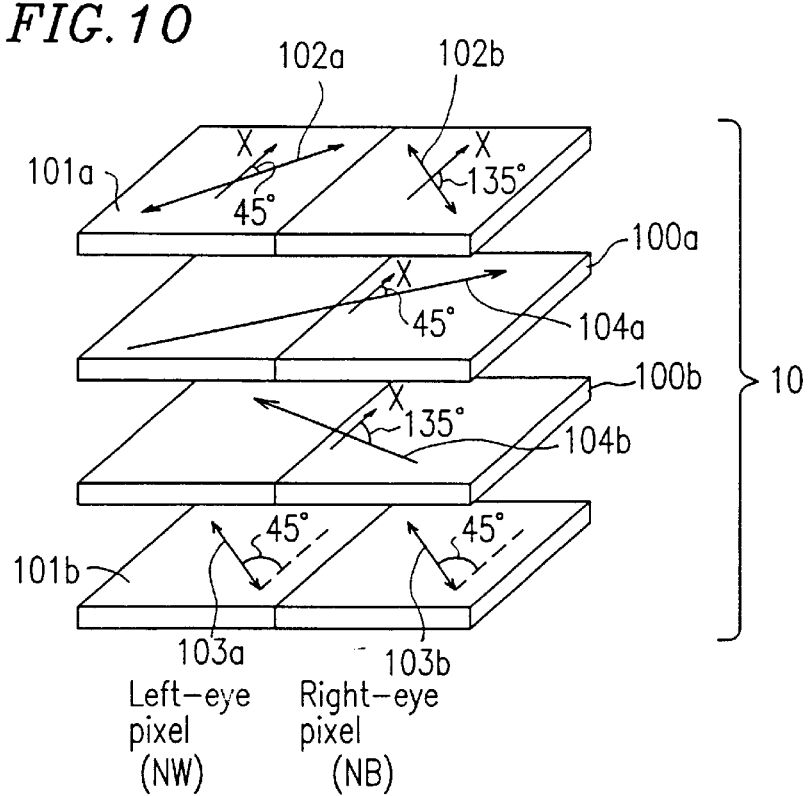
FIG. 10 is a schematic representation illustrating an exemplary conventional stereoscopic display device.
Figure 11:
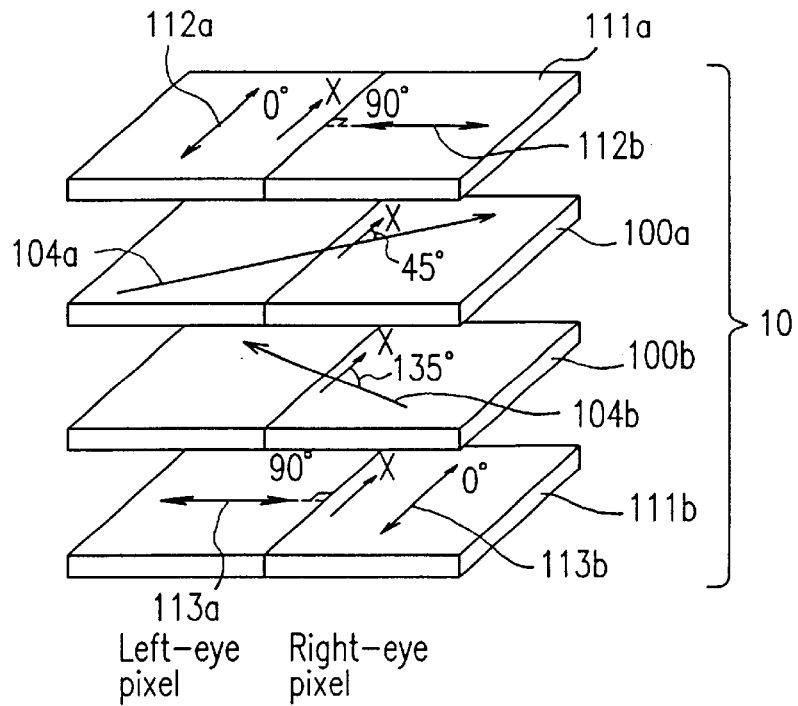
FIG. 11 is a schematic representation illustrating another exemplary conventional stereoscopic display device.
Figure 12:
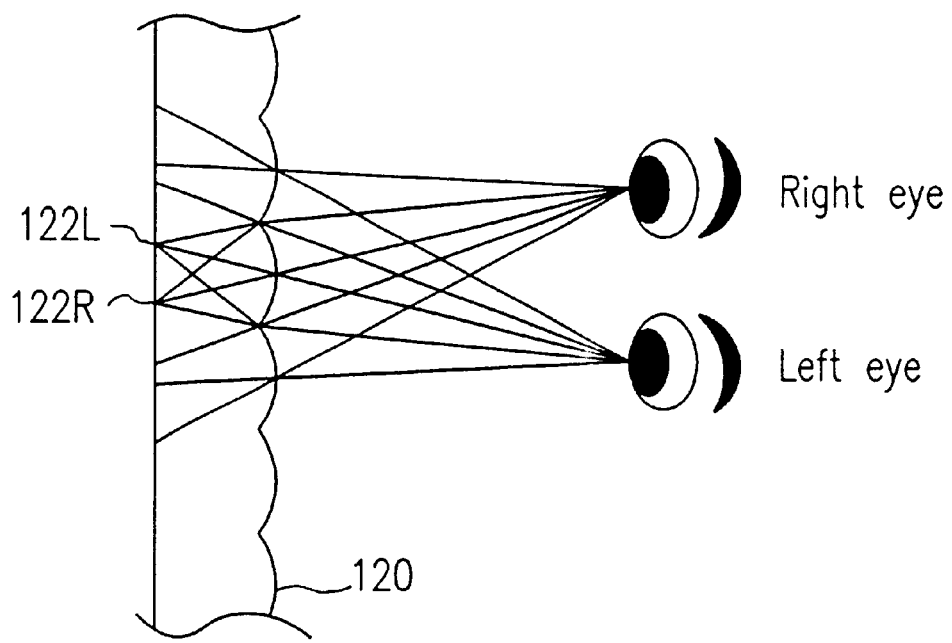
FIG. 12 is a schematic representation illustrating a principle that a stereoscopic image can be displayed by using a lenticular plate.
Figure 13:
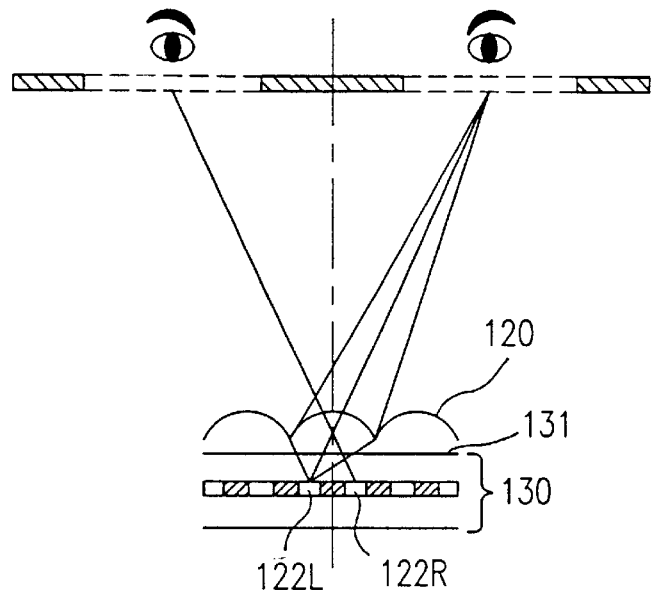
FIG. 13 is a schematic representation showing a conventional stereoscopic display device using a lenticular plate.
Figure 14:
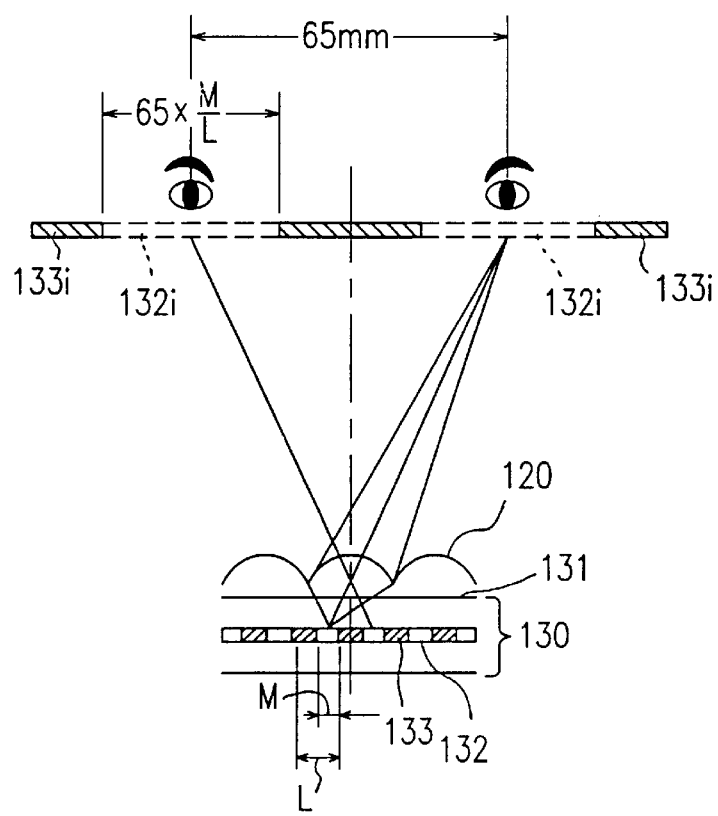
FIG. 14 is a schematic representation illustrating a case where a three-dimensional image cannot be viewed in a conventional stereoscopic display device using a lenticular plate.

A polarizing film as the polarization layer 42a was attached to the surface, facing the display medium (i.e., the opposed surface), of the substrate 41a, and another polarizing film as the polarization layer 42b was disposed on the surface, opposite to the opposed surface, of the substrate 41b. In this case, the polarization layer 42a was disposed such that neither the slow axis direction or the fast axis direction $a''_1$ of the first region 45a of the phase sheet or the slow axis direction or the fast axis direction $a''_2$ of the second region 45b thereof became parallel or vertical to the polarized light transmission axis P" of the polarization layer 42a as shown in FIG. 9.

Next, the stripe-shaped transparent electrodes 43a and 43b made of ITO were formed by a sputtering method over the substrates 41a and 41b, respectively. Each of the transparent electrodes was formed so as to have a width of about 280 μm, a gap of about 20 μm and a thickness of about 70 nm. In this case, the positions of the stripe-shaped transparent electrodes 43a and 43b were adjusted such that the respective pixels corresponded to the regions 45a and 45b of the substrate 41a having respectively different slow axis directions or fast axis directions.

Next, electrically insulating films made of $SiO_2$ were formed so as to respectively cover the transparent electrodes 43a and 43b. The thickness of the insulating film was set at about 100 nm. Furthermore, alignment films made of polyimide were formed over the electrically insulating films so as to be about 70 nm thick. The alignment films were subjected to a rubbing treatment by using cloth of nylon.

Thereafter, the pair of substrates 41a and 41b thus fabricated were opposed to each other such that the stripe-shaped transparent electrodes 43a and 43b crossed each other at a right angle. Then, the end portions of the substrates 41a and 41b were attached to each other via a seal member 48 after spacers 47 had been introduced into the gap between the substrates 41a and 41b. In this process step, a part of the periphery of each of the substrates 41a and 41b was left open as injection holes (not shown).

Subsequently, ZLI-4792 (manufactured by Merck & Co., Inc.) containing about 0.3% of a chiral agent (S-811) was injected as a liquid crystal material 46 through the injection holes into the gap between the pair of substrates 41a and 41b in accordance with a known vacuum injection method under an environment in which the temperature was about 25° C. and the humidity was about 20%. After the injection, the injection holes were sealed with an ultraviolet curable resin, thereby fabricating the stereoscopic display device 4.

A right-eye signal and a left-eye signal were respectively transmitted to a pixel corresponding to the first region and a pixel corresponding to the second region of the stereoscopic display device thus fabricated, thereby displaying an image. The image was observed with a pair of spectacles provided with a circular polarizer obtained by attaching a phase sheet and a polarizer to each other. In the phase sheet, the slow axis direction or fast axis direction of the region for the right eye was different from the counterpart of the region for the left eye by 90 degrees. The polarizer had a transmission axis direction different from any of the slow axis directions or the fast axis directions of the phase sheet. As a result, the image was observed as a stereoscopic image. In this example, since the phase sheet including the first and the second regions having respectively different slow axis directions or fast axis directions was provided directly on the substrate, the sharpness of the stereoscopic image could be further improved.

As is apparent from the foregoing description, in the phase sheet of the present invention, the first and the second regions having respectively different slow axis directions or fast axis directions may be formed in the sheet. Consequently, the vibration direction of the polarized light transmitted through the first region becomes different from that of the polarized light transmitted through the second region. Moreover, since the phase sheet of the present invention is preferably made of polymers having uniaxial orientation properties, the sheet of the present invention may be a thin film in which photoisomeric molecules are oriented with a high density and a sufficient phase difference is established.

The stereoscopic display device of the present invention transmits appropriate signals to the respective pixels in view of a parallax, thereby making different the vibration direction of the polarized light outgoing from a right-eye pixel from that of the polarized light outgoing from a left-eye pixel. Thus, if a viewer wears a pair of spectacles to which a polarizer having appropriate transmission axes with respect to the right-eye polarized light and the left-eye polarized light has been attached, then the viewer can perceive the right-eye image component only with the right eye and the left-eye image component only with the left eye. Consequently, these image components may be perceived as a stereoscopic image.

Furthermore, in the stereoscopic display device of the present invention, two types of regions having respectively different slow axis directions or fast axis directions are provided on the substrate. Thus, the vibration direction of the polarized light outgoing from a right-eye pixel may be different from that of the polarized light outgoing from a left-eye pixel before light is transmitted through an isotropic layer such as a glass substrate. Consequently, it is possible to suppress the loss of the degree of separation between the right-eye image component and the left-eye image component.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A phase sheet comprising:

a first region and a second region which have respectively different slow axis directions or fast axis directions, wherein a polymer constituting the sheet contains a photoisomeric molecule, and wherein the polymer is a polymer liquid crystal molecule.

2. A phase sheet according to claim 1, wherein the polymer liquid crystal molecule is a main-chain polymer liquid crystal molecule.

3. A phase sheet according to claim 1, wherein the polymer liquid crystal molecule is a side-chain polymer liquid crystal molecule.

4. A phase sheet comprising:

a first region and a second region which have respectively different slow axis directions or fast axis directions, wherein a polymer constituting the sheet contains a photoisomeric molecule, wherein the polymer comprises a polymerizable resin that is a compound having a polymerizable liquid crystal structure.

* * * * *